United States Patent [19]

Peterson et al.

[11] Patent Number: 5,274,762
[45] Date of Patent: Dec. 28, 1993

[54] METHOD FOR HIGH SPEED DATA TRANSFER

[75] Inventors: Paul A. Peterson, Dayton; Gilbert W. Goodridge, Oxford, both of Ohio

[73] Assignee: NCR Corporation, Dayton, Ohio

[21] Appl. No.: 451,396

[22] Filed: Dec. 15, 1989

[51] Int. Cl.⁵ .............................................. G06F 13/00
[52] U.S. Cl. .......................... 395/200; 364/DIG. 1; 364/228.5; 364/238; 364/238.5; 364/239; 364/284.3; 364/284.4
[58] Field of Search ... 364/200 MS File, 900 MS File; 395/200, 325

[56] References Cited

U.S. PATENT DOCUMENTS

| | | | |
|---|---|---|---|
| 4,561,053 | 12/1985 | Crawford | 364/200 |
| 4,644,463 | 2/1987 | Hotchkin et al. | 364/200 |
| 4,839,802 | 6/1989 | Wonak et al. | 364/200 |
| 4,884,269 | 11/1989 | Duncanson et al. | 370/110.1 |
| 4,961,185 | 10/1990 | Sawada | 370/79 |
| 4,974,192 | 11/1990 | Face et al. | 364/900 |
| 4,994,963 | 2/1991 | Rorden et al. | 364/200 |
| 4,998,240 | 3/1991 | Williams | 370/17 |
| 5,056,088 | 10/1991 | Price et al. | 370/94.1 |
| 5,142,525 | 8/1992 | Nakatsuma | 370/13 |
| 5,193,089 | 3/1993 | Tsuchida | 370/84 |

Primary Examiner—Gareth D. Shaw
Assistant Examiner—Brian Klock
Attorney, Agent, or Firm—Douglas S. Foote

[57] ABSTRACT

A method for high speed data transfer between a user operated PC and a remote PC. First, a link is established between the user operated PC and remote PC. A data file is transferred from the user operated PC to an interfacing device connected to the user operated PC. The file is then formatted in the interfacing device, and transmitted therefrom to the remote PC over an ISDN line. A second data file may be transferred from the remote PC to the user operated PC contemporaneously with the transferring, formatting and transmitting of the other data file.

27 Claims, 22 Drawing Sheets

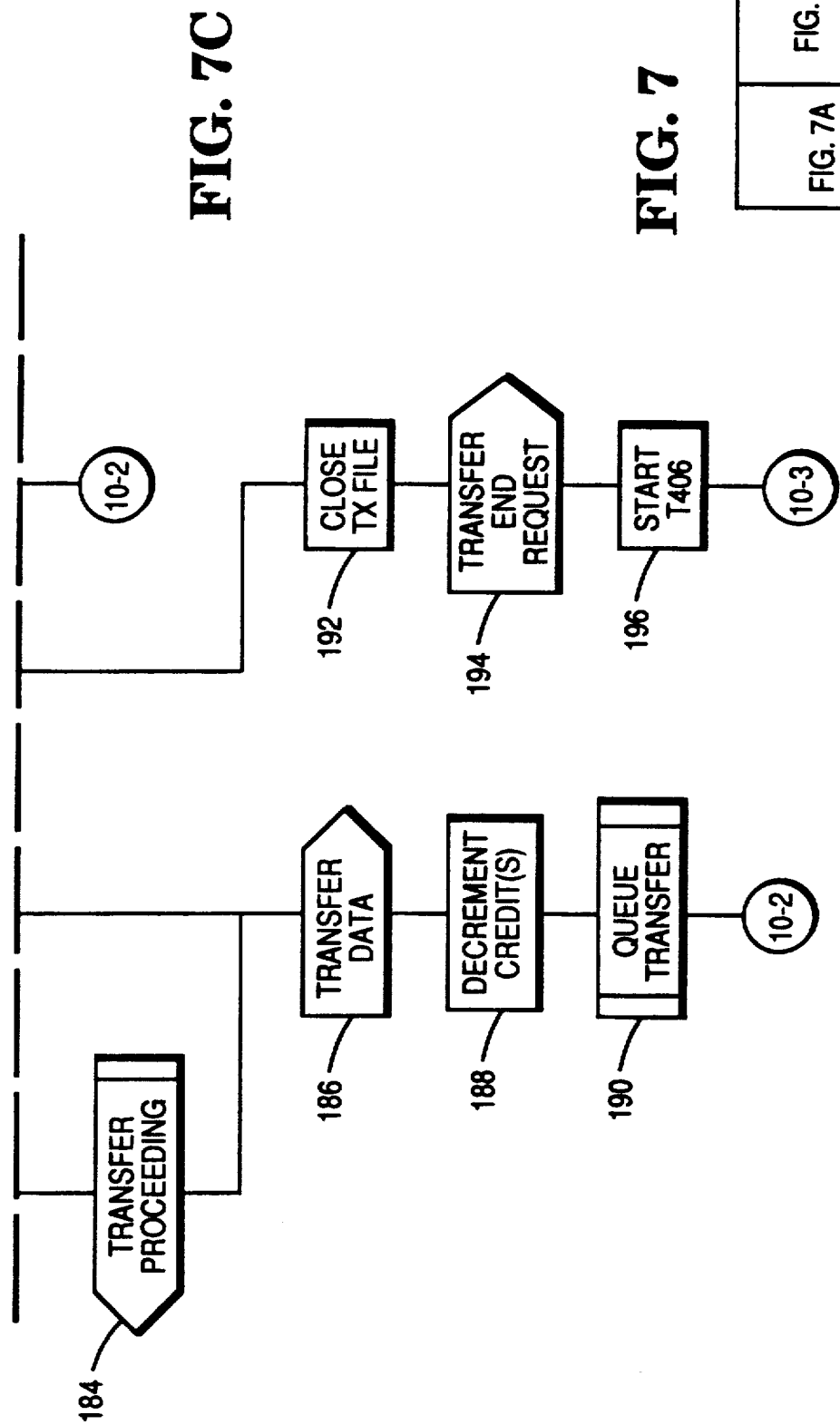

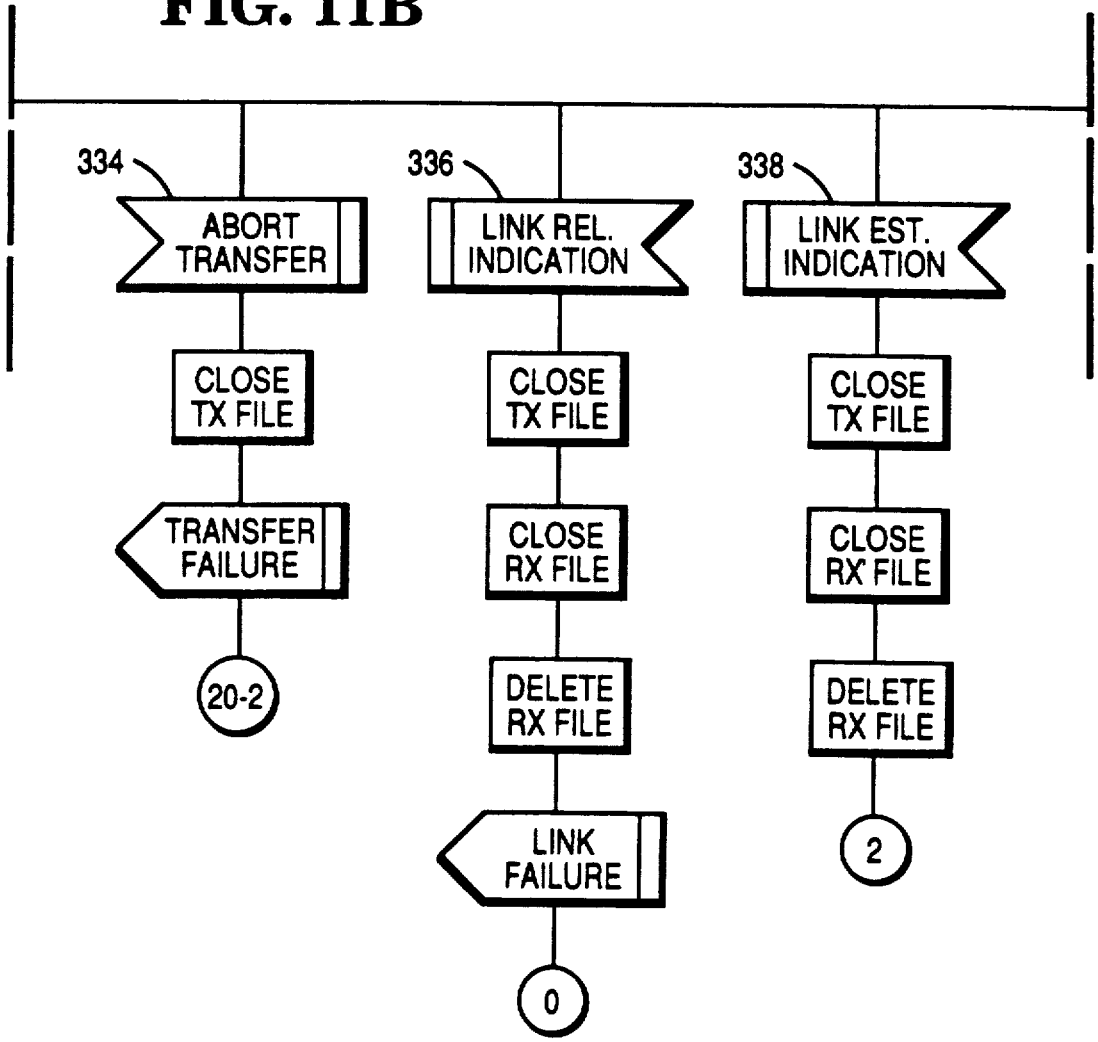

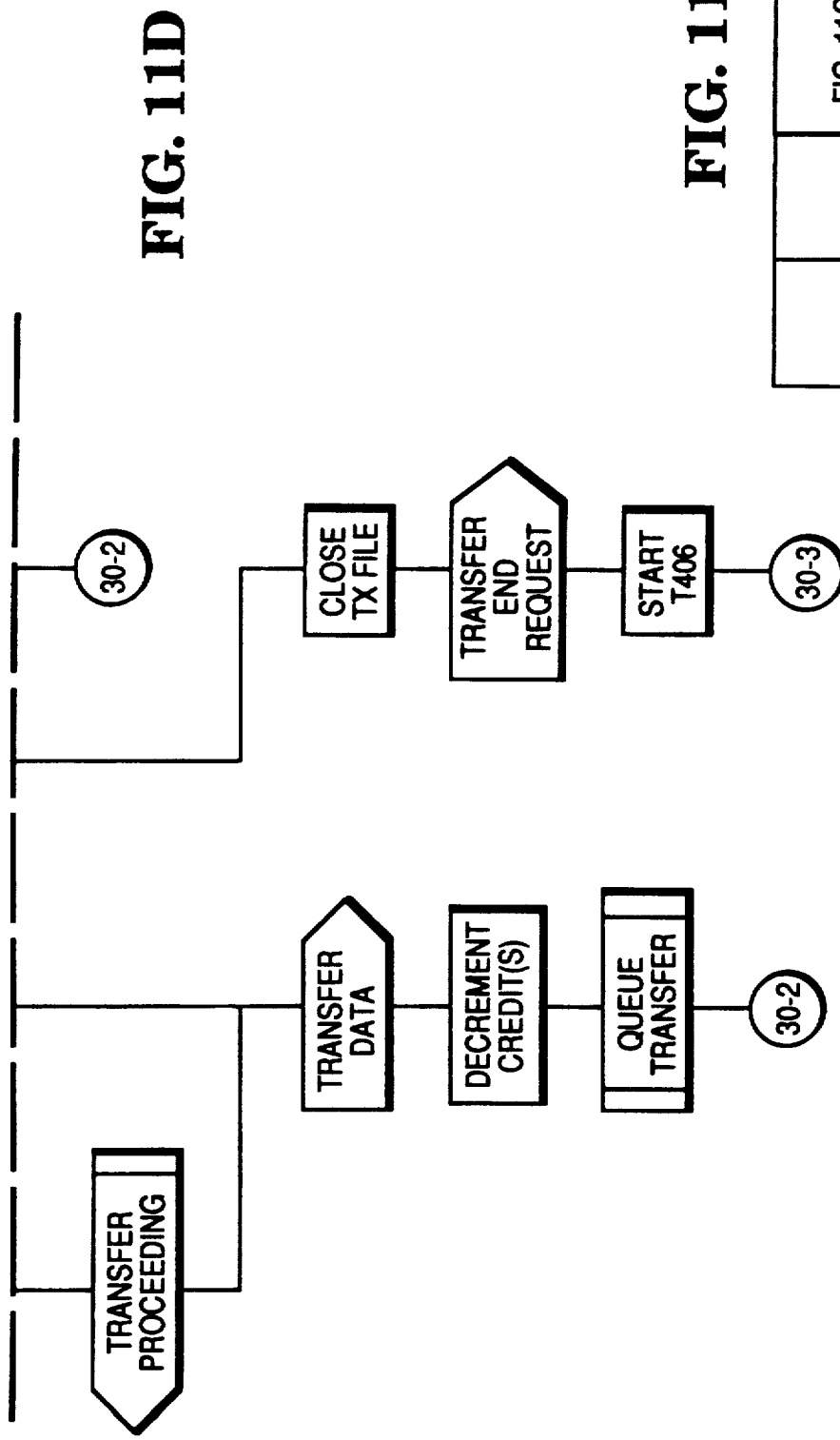

METHOD FOR HIGH SPEED DATA TRANSFER

The present invention relates to a method for transferring data between a local and remote PC over an ISDN transmission line. More particularly, it relates to a file transfer protocol for achieving reliable and high speed data transfer therebetween.

BACKGROUND OF THE INVENTION

This application is related to U.S. patent application Ser. No. 450,972 filed concurrently herewith now U.S. Pat. No. 5,195,184.

In the past, the transfer of data between remotely located terminal equipment such as PCs has been relatively slow and characterized by transmission errors. Telephone lines used for data transfers have one or more links which only carry analog signals. Typically, the local telephone line or link between a PC and the first switching station handles only analog signals. In order to serially transmit data from a PC over an analog phone line, a device such as a modem converts digital data to an analog signal. Although many long distance calls are converted and transmitted digitally, there still remains a number of analog links for most transmissions. The problem with analog transmission is that amplifiers used to boost the analog signals can distort the original signal causing error rates in the data roughly proportional to the distance of the transmission. As a result of the relatively large number of errors possible from such transmissions, relatively small packets of data are transmitted at one time with frequent retransmission of the data as errors are detected. The result of such transmission errors is to slow down the data transfer rate with typical rates at about 1200 to 2400 bits per second.

In recent years, technology for digital data transmission has advanced. Digital transmission has a much lower error rate since amplifiers can easily and exactly restore a digital signal which only has two possible values. Digital transmission also permits multiplexing of various digitally encoded signals such as data, audio and video. Digital transmission is increasingly playing an important role in enhancing wide area computer networks which utilize telephone lines. One such digital network is referred to as Integrated Services Digital Network (ISN). ISDN offers a wide range of services, most notably an increased transmission speed on the order of 64,000 bits per second.

In order to take full advantage of the potential of ISDN, data throughput as it relates to the speed at which data is transferred onto an ISDN line must be addressed. A typical PC has a terminal adaptor card for interfacing with a communications line. This card receives blocks of data from the PC, transmits the data over the communications line, and then sends an acknowledge signal to the PC. The time required to transfer a data block from the PC to the terminal adaptor card and to wait for an acknowledgment can be many times greater than the time required to transmit the data block over the ISDN line.

In the past, communications software for PCs has provided transmission and reception modes of operation. In the reception mode, error checking of received data has been performed by the PC's processor. This has resulted in significant overhead to the PC which has the effect of further slowing down both the communication speed and the speed at which the PC's processor can perform its other tasks. Operation is additionally slowed by the normal practice of temporally separating transmission and reception modes.

Many PC's have also been designed to communicate with a plethora of different systems—each having its own protocol for receipt and transmission of data. As a consequence, PC to PC communications are weighted down with many layers of protocol which further slows the speed of communication and other operations by requiring additional processor time.

OBJECTS OF THE INVENTION

It is therefore an object of the present invention to provide a new and improved method for high speed data transfer between a user operated PC and a remote PC.

It is another object of the present invention to provide an efficient file transfer protocol for use in a PC environment.

It is a further object of the present invention to provide a method for transferring data between PCs with reduced software overhead and PC processor time.

It is yet another object of the present invention to provide a method for PC to PC communication over an ISDN line.

SUMMARY OF THE INVENTION

The present invention is a method for high speed data transfer between a user operated PC and a remote PC. An interfacing device is connected to the user operated PC and has a dedicated processor. The method comprises establishing a link between the user operated PC and remote PC, and transferring a data file from the user operated PC to the interfacing device. The file is then formatted in the interfacing device, and transmitted therefrom to the remote PC over an ISDN line. A second data file may be transferred from the remote PC to the user operated PC contemporaneously with the transferring, formatting and transmitting of the other data file.

BRIEF DESCRIPTION OF THE DRAWINGS

FIGS. 3-5, 6A, 6B, 7, 7A, 7B, 7C, 8, 9A, 9B, 10, 10A, 10B, 10C, 11, 11A, 11B, 11C, 11D, 12A, 12B, show a state diagram which illustrates the method according to one form of the present invention.

DESCRIPTION OF A PREFERRED EMBODIMENT

Figure 1:
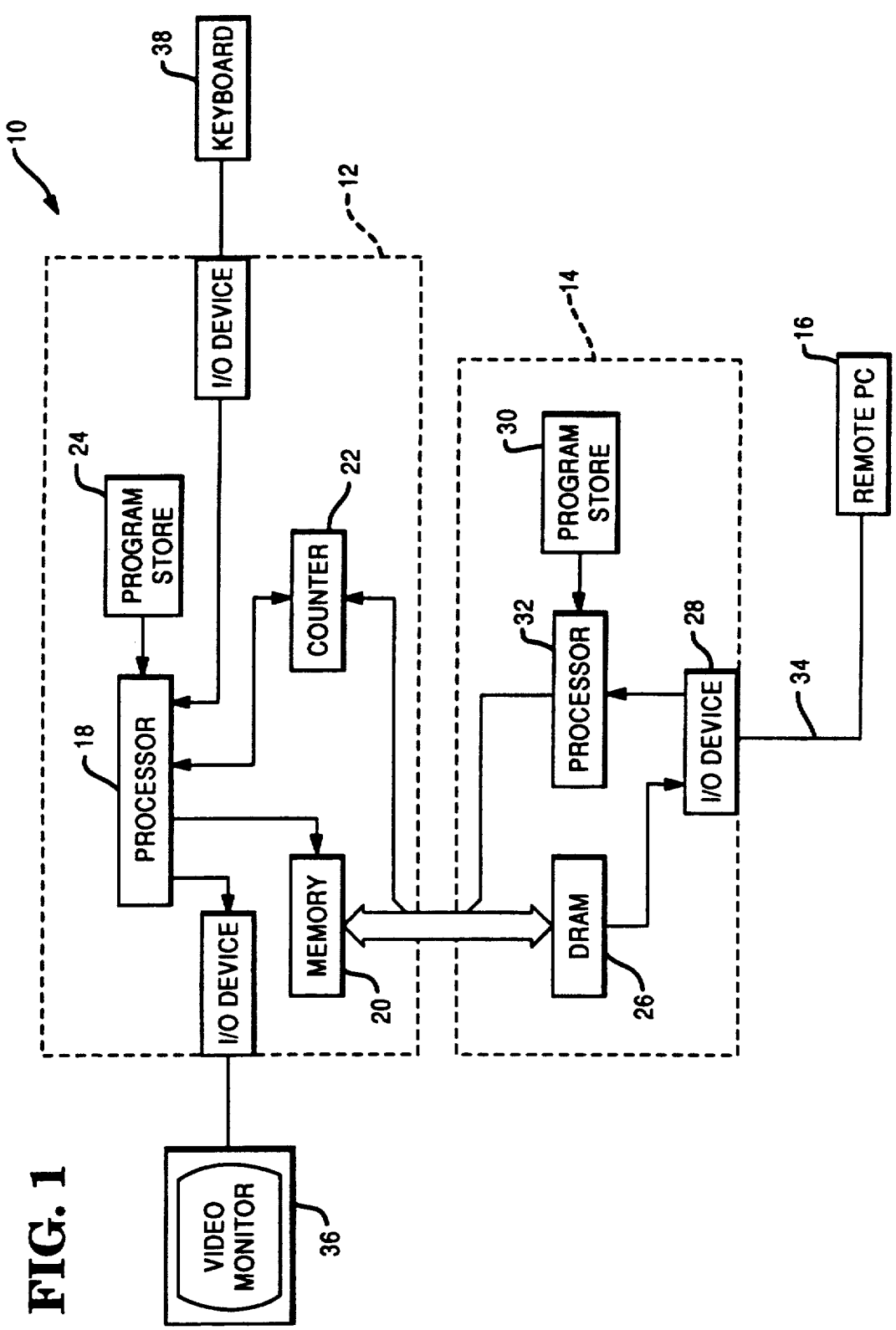
FIG. 1 is a block diagram of a data communications system such as may employ the subject invention.

FIG. 1 shows a data communications system 10 having a personal computer (PC) 12, video monitor 36, keyboard 38, interfacing device 14 and a remote PC 16. PC 12 is a local or user operated PC in which monitor 36 provides messages to an operator or user, and keyboard 38 transfers messages from the user. PC 12 includes a processor 18, memory 20, counter 22, and a program store 24. Data to be transferred from PC 12 is stored in memory 20 in a plurality of logically defined data frames or data blocks. Data blocks are transferred from PC 12 under the control of processor 18 running a program in store 24 and subject to the value in counter 22, as will be described more fully hereinafter.

Interfacing device 14 includes a dynamic RAM (DRAM) 26, an I/O device 28, a program store 30 and a dedicated processor 32. Interfacing device 14 is connected to PC 12. In a preferred embodiment, interfacing device 14 is a modular board or card which may be plugged into an expansion slot on PC 12. An interfacing device as may be used in conjunction with the present invention is the ISDN PC Terminal Adaptor Card available from NCR Corporation, Dayton, Ohio 45479. DRAM 26 includes a plurality of logically defined memory units or buffers for receiving data blocks transferred from PC 12. Typically, data is transferred in parallel from PC 12 to interfacing device 14. I/O device 28 serially transmits data from DRAM 26, over an ISDN transmission line 34, to remote PC 16. I/O device 28 also receives acknowledge signals from remote PC 16 over ISDN line 34 for each data block successfully transmitted. I/O device 28 may also receive data from remote PC 16 as well as transmit acknowledge signals in response thereto.

Counter 22 stores a block count of the number of data blocks which at any given time may be transferred from memory 20 to DRAM 26. The count is decremented in response to each data block so transferred, and the count in incremented in response to each acknowledge signal received by counter 22.

The present invention may be viewed in the context of protocol hierarchies for network architectures, and more particularly in the context of the International Standards Organization (ISO) Reference Model. The ISO Reference Model of Open Systems Interconnection (OSI) is a seven layer network architecture. The seven layers of the ISO OSI model are in descending order: layer seven—application protocol, layer six—presentation protocol, layer five—session protocol, layer four—transport protocol, layer three—network protocol, layer two—data link protocol, and layer one—physical link protocol. In the present invention processor 32 in interfacing device 14 is dedicated to performing all of the layer one and layer two protocols. For example, all error checking of data blocks received from remote PC 16 is accomplished with conventional algorithms stored in program store 30 and run by processor 32. This allows processor 18 in PC 12 to handle other operations without the software overhead normally associated with error checking routines. Interfacing device 14 will request retransmission of any data blocks from remote PC 16 having errors. Similarly, interfacing device 14 will hold data blocks in DRAM 26 for possible retransmission until acknowledged by remote PC 16. Thus, PC 12 may assume data received from remote PC 16 through interfacing device 14 is valid, and may also assume that data transferred from its memory 20 to DRAM 26 will be successfully transmitted.

The method of the present invention for transferring data between remotely located PCs over an ISDN line involves features of the file transfer protocol as performed on PC 12 together with various operational features of interfacing device 14. The invention, as defined by this relationship, should become clear from the following discussion of the file transfer protocol. Relevant operational characteristics of interfacing device 14 will be included in this discussion.

Figure 2:
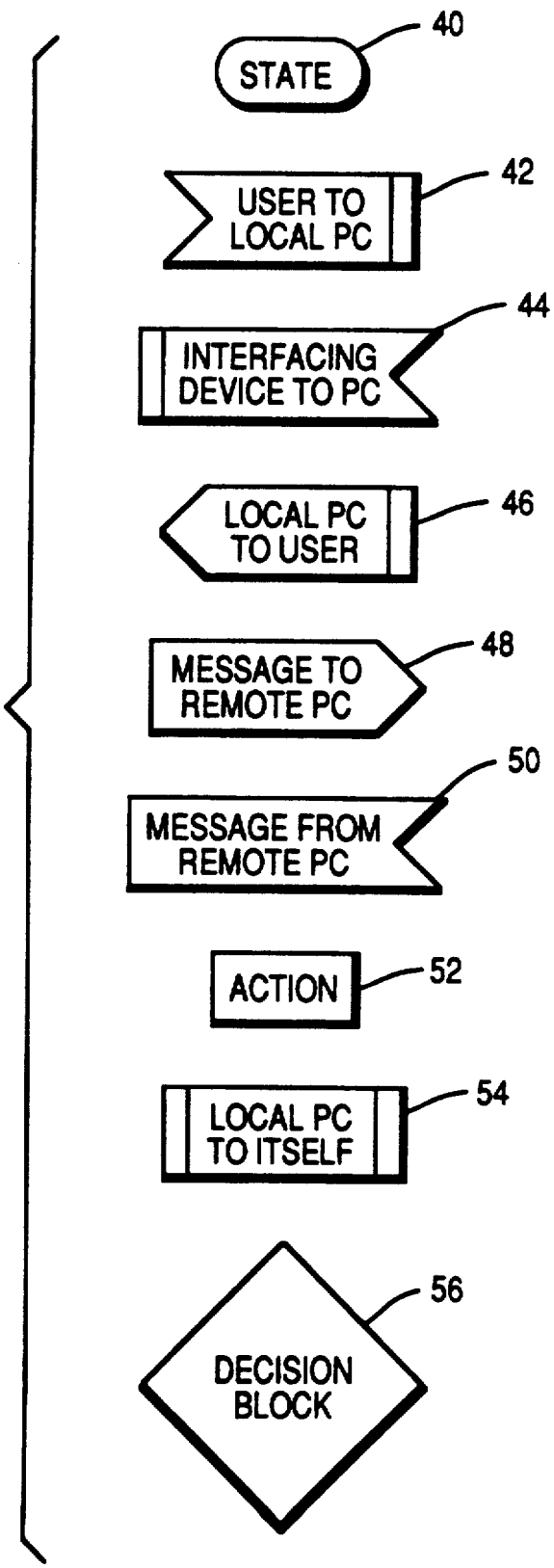
FIG. 2 is key which explains some of the symbols used in the state diagram of FIGS. 3-13.

FIG. 2 shows symbols used in the state diagram of FIGS. 3-13. The following table explains these symbols.

| Symbol | Represents |
|--------|-----------|
| 40 | state of PC 12 |
| 42 | message from the user of PC 12 to PC 12 |
| 44 | message from interfacing device 14 to PC 12 |
| 46 | message from PC 12 to the user |
| 48 | message from PC 12 to PC 16 |
| 50 | message from PC 16 to PC 12 |
| 52 | action for PC 12 |
| 54 | stimulus from PC 12 to itself |
| 56 | decision block |

FIGS. 3-13 are a state diagram of a file transfer protocol according to one form of the present invention. In a preferred embodiment the protocol may be implemented in software and stored in program store 24. As described herein, PC 12 operating under the control of the such software will be referred to as a "file transfer engine."

Figure 3:
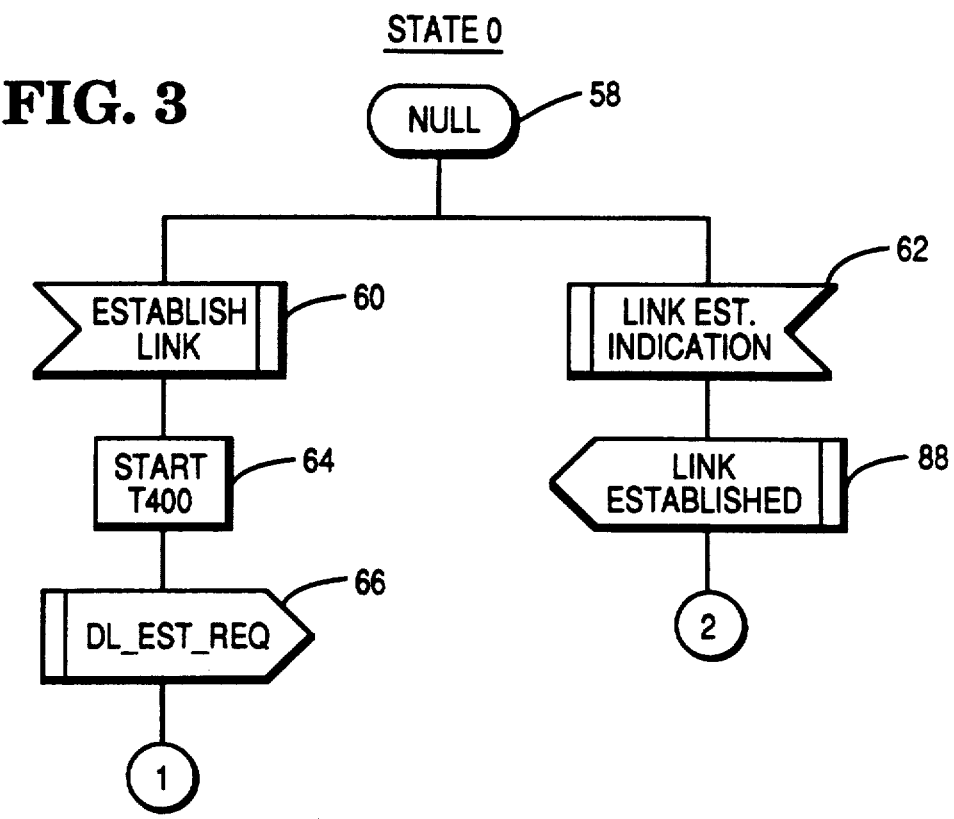

FIG. 3 shows the initial or null state 0 (block 58), prior to data being transmitted between local PC 12 and remote PC 16. The first step in the process is to establish a link between the PCs. This may be initiated either by the user of local PC 12 or by remote PC 16. The local user can start this process by providing an establish link request to PC 12 (block 60) by way of keyboard 38. Alternatively, remote PC 16 may request the establishment of link. Since the establishment of a physical link is a conventional layer two task, interfacing device 14 performs this function in response to a request from PC 16, and provides a link established indication to PC 12 (block 62) when complete.

If the local user provides an establish link request (block 60) to PC 12, a timer T400 is started (block 64) to limit the time allotted to establishing the link. The link request, DL—EST—REQ, is transferred from PC 12 to interfacing device 14 (block 66). Interfacing device 14 provides layer two and layer one services to the link request under the control of its dedicated processor 32. These services include formatting the link request into a conventional data link protocol and transmitting the formatted request to remote PC 16 over ISDN line 34 to attempt to establish communication with PC 16. The ISO OSI model allows four attempts to establish the link. The link is established when interfacing device 14 receives a link established signal transmitted from remote PC 16. After transferring the link request to interfacing device 14, the file transfer engine goes to the Link Establishment Requested state 1 (block 68) (FIG. 4).

As note above, if remote PC 16 requests establishment of a link and a link is established through interfacing device 14, a link established indication is provided to PC 12 (block 62) (FIG. 3). A link established message is then displayed on video monitor 36 (block 88), and the file transfer engine enters the Link Established state 2 (block 76) (FIG. 5).

Figure 4:
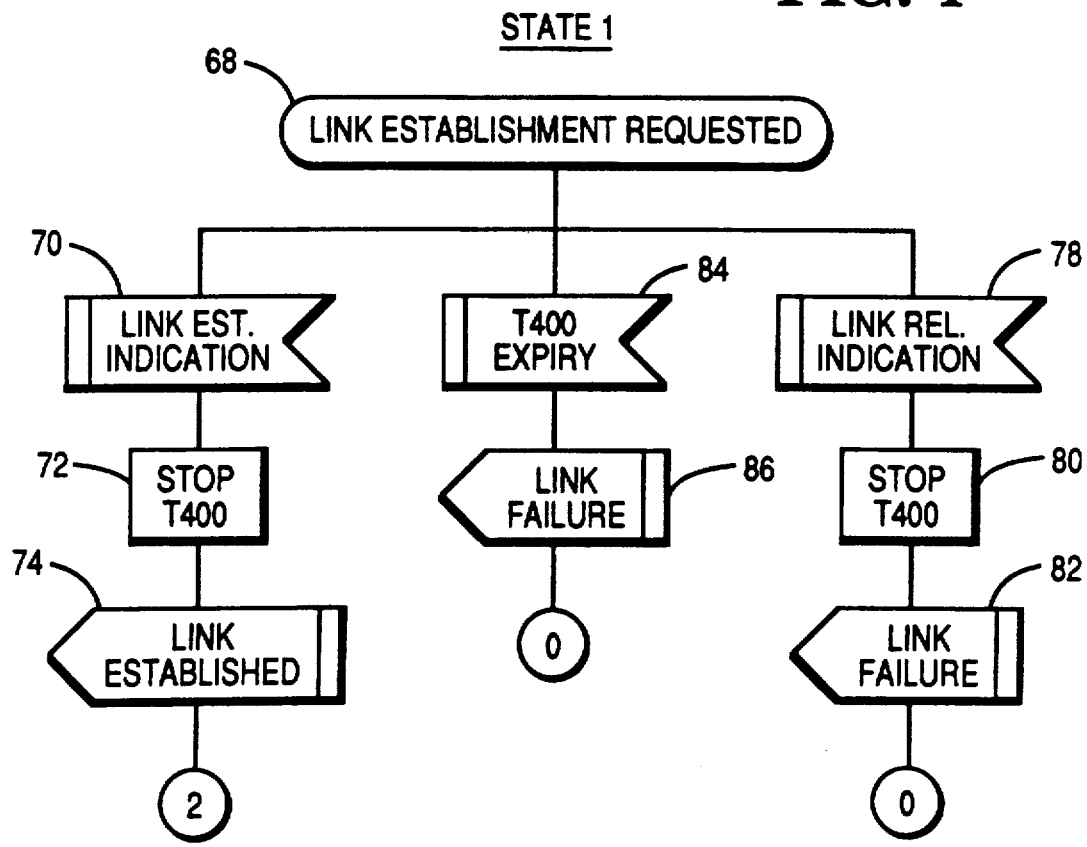

FIG. 4 describes the Link Establishment Requested state 1 (block 68). If interfacing device 14 is successful in establishing a link with PC 16, a link established indication or signal will be transferred from interfacing device 14 to PC 12 (block 70). Timer T400 is then stopped (block 72), and a link established message is displayed on video monitor 36 (block 74). The file transfer engine then enters the Link Established state 2 (block 76) (FIG. 5). If interfacing device 14 is not successful in establishing a link with PC 16, a link released indication or signal that a link has not been established is transferred from interfacing device 14 to PC 12 (block 78). Timer T400 is then stopped (block 80), a link failure message is displayed on video monitor 36 (block 82), and the file transfer engine returns to Null state 0 (block 58) (FIG. 3). In the event of an error or problem that prevents interfacing device 14 from transferring a link established signal or link released signal to PC 12, timer T400 will expire (block 84). In response to the expiration of timer T400, a link failure message is displayed on video monitor 36 (block 86), and the file transfer engine returns to Null state 0 (block 58) (FIG. 3).

Figure 5:
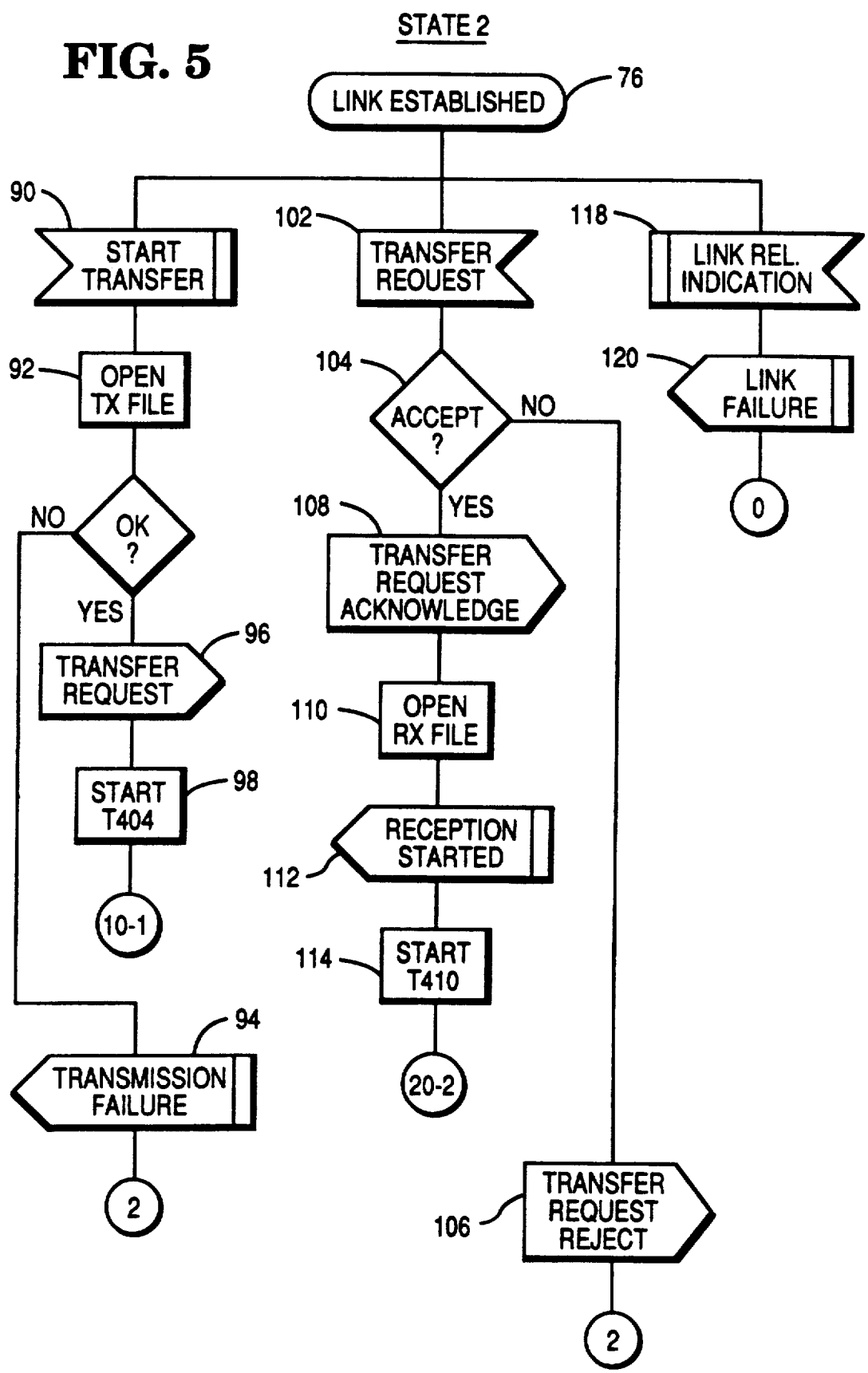

FIG. 5 describes the Link Established state 2 (block 76). It makes no difference whether local PC 12 or remote PC 16 initiated the link request resulting in the link up, either PC may start a data transfer from this state. In order to transfer a data file from PC 12, the PC user will provide a message to PC 12 over keyboard 38 to start a transfer of an identified data file (block 90). PC 12 will verify the specified file is valid by attempting to open it (block 92). If the file name is invalid, a transmission failure message is displayed on video monitor 36 (block 94). If the file name is valid, PC 12 makes a transfer request which includes the size of the data file to be transferred (block 96). As with all PC 12 to PC 16 communications, the transfer request and data file size are provided to interfacing device 14 where the information is formatted and transmitted to PC 16. Timer T404 is started (block 98) to limit the time allotted to receiving a transfer request acknowledgement from PC 16. After timer T404 is started, the file transfer engine enters Transmission Requested state 10-1 (block 100) (FIGS. 6A and 6B).

Figure 9A:
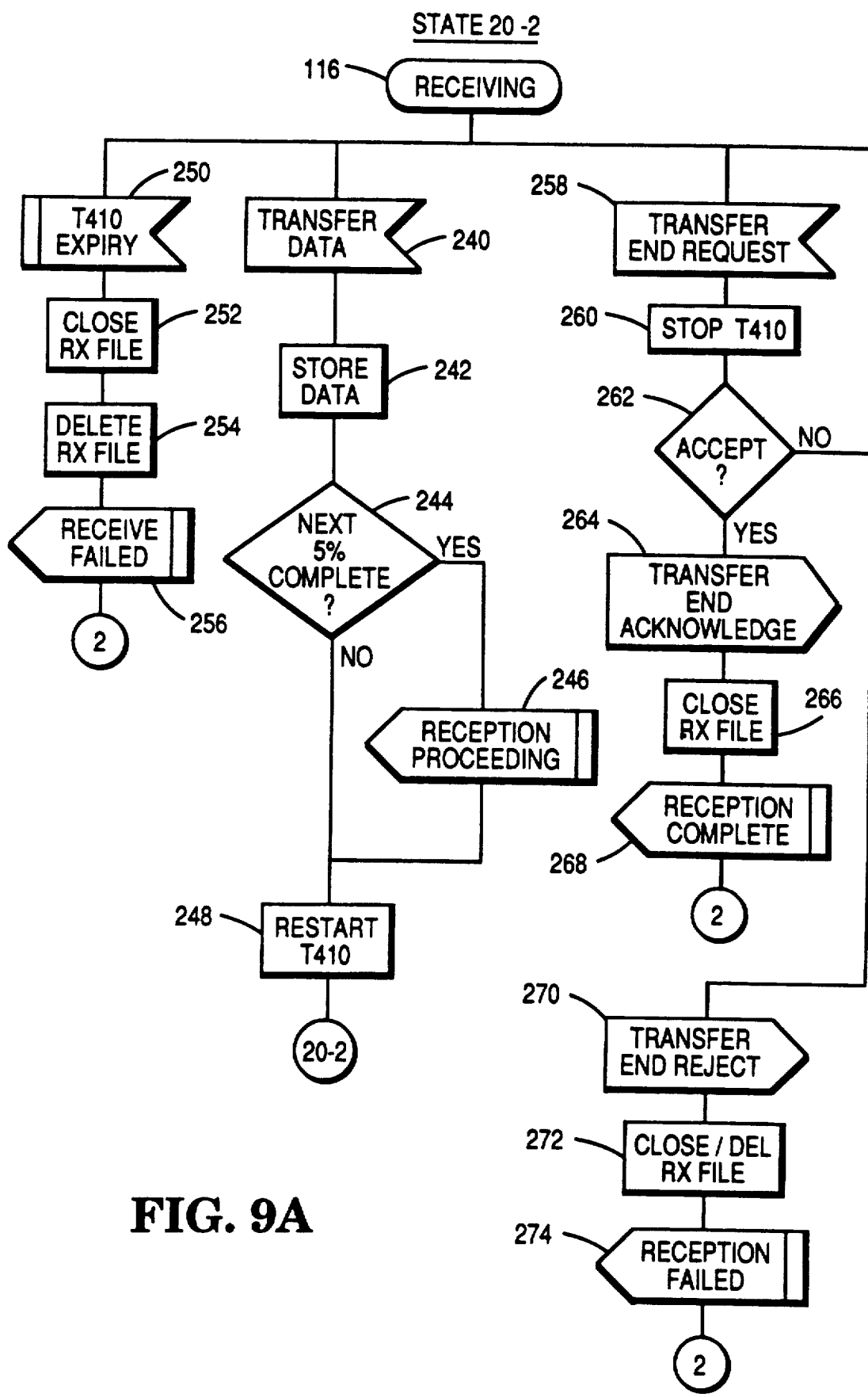
Figure 9B:
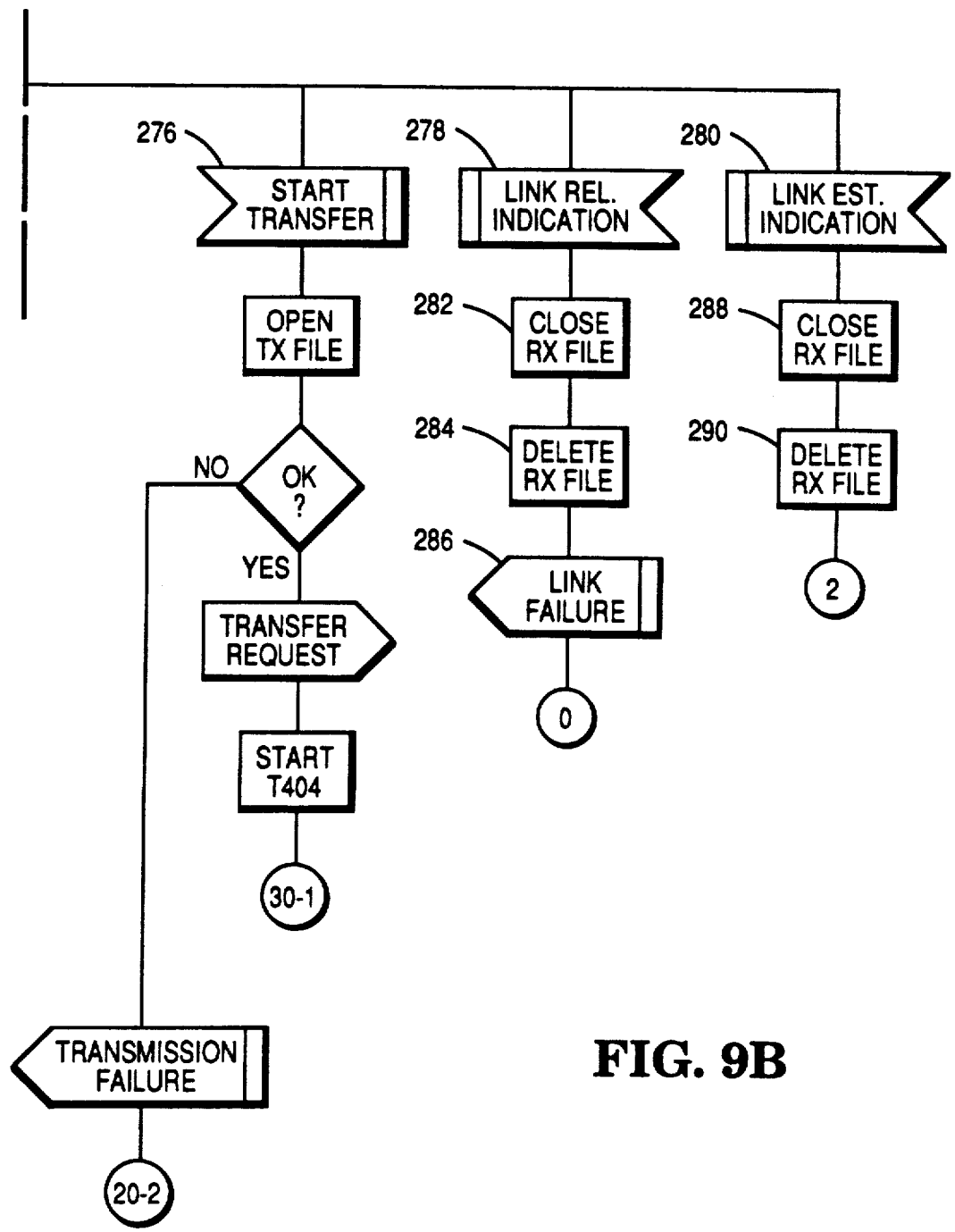

If a transfer request is received from PC 16 (block 102) (FIG. 5), PC 12 will have to determine whether to accept the data (block 104). PC 12 makes this determination by comparing the size of the data file to be transferred (information included in the transfer request) to its free memory capacity. If there is insufficient memory space, a transfer request rejection is transmitted to PC 16 (block 106), and the file transfer engine returns to state 2. If PC 12 verifies that there is sufficient memory space to store the data file from PC 16, a transfer request acknowledgement is transmitted to PC 16 (block 108), and a file space is opened for receiving the file as it is transferred (block 110). A data reception started message is displayed on video monitor 36 (block 112), and a timer T410 is started (block 114) to limit the time for receiving the first data block from PC 16. The file transfer engine now enters Receiving State 20-2 (block 116) (FIGS. 9A and 9B).

If the data link is lost in state 2 (FIG. 5), a link released indication is provided by interfacing device 14 to PC 12 (block 118). A link failure message is then displayed on video monitor 36 (block 120), and the file transfer engine returns to null state 0.

Figure 6A:
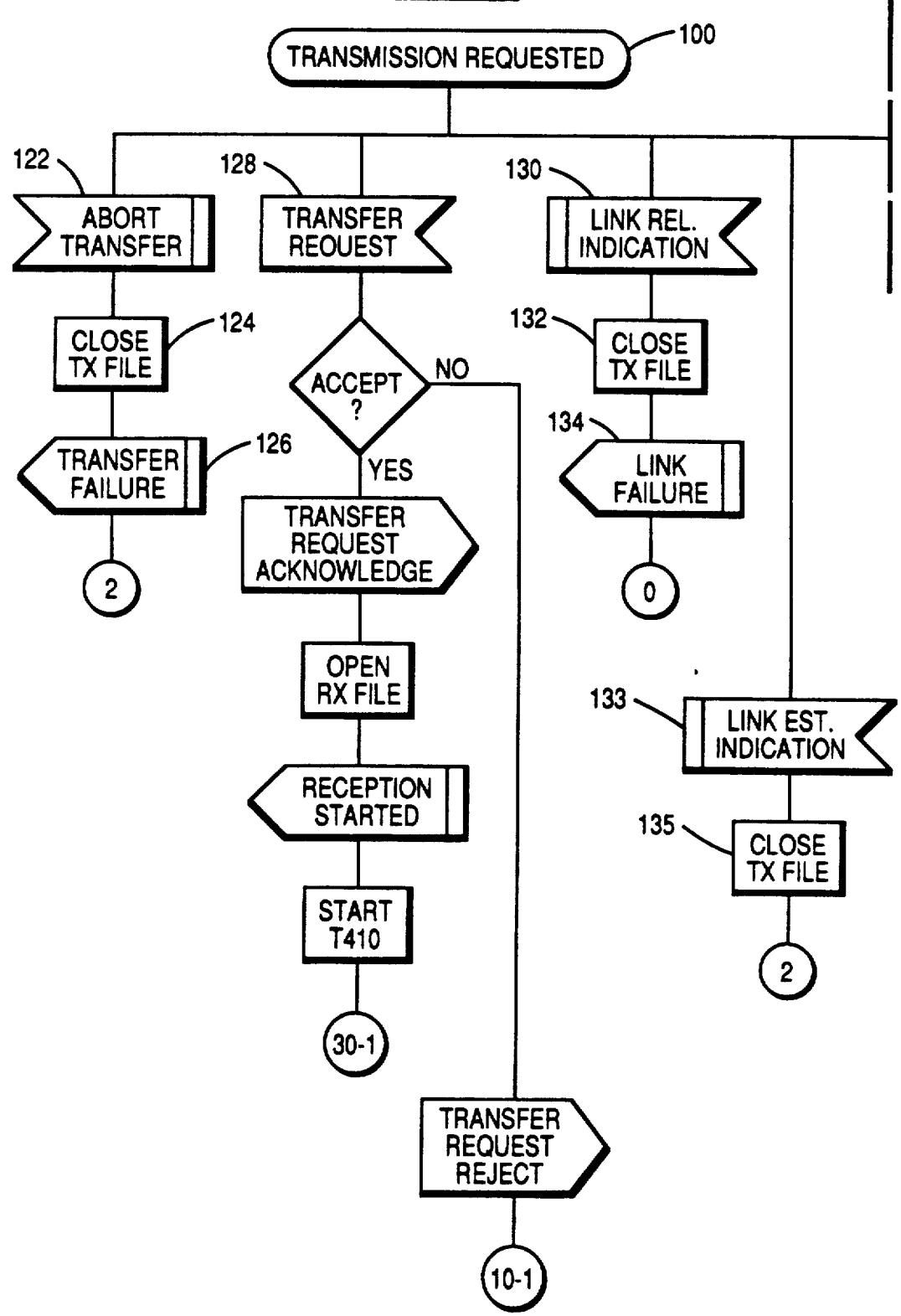
Figure 6B:
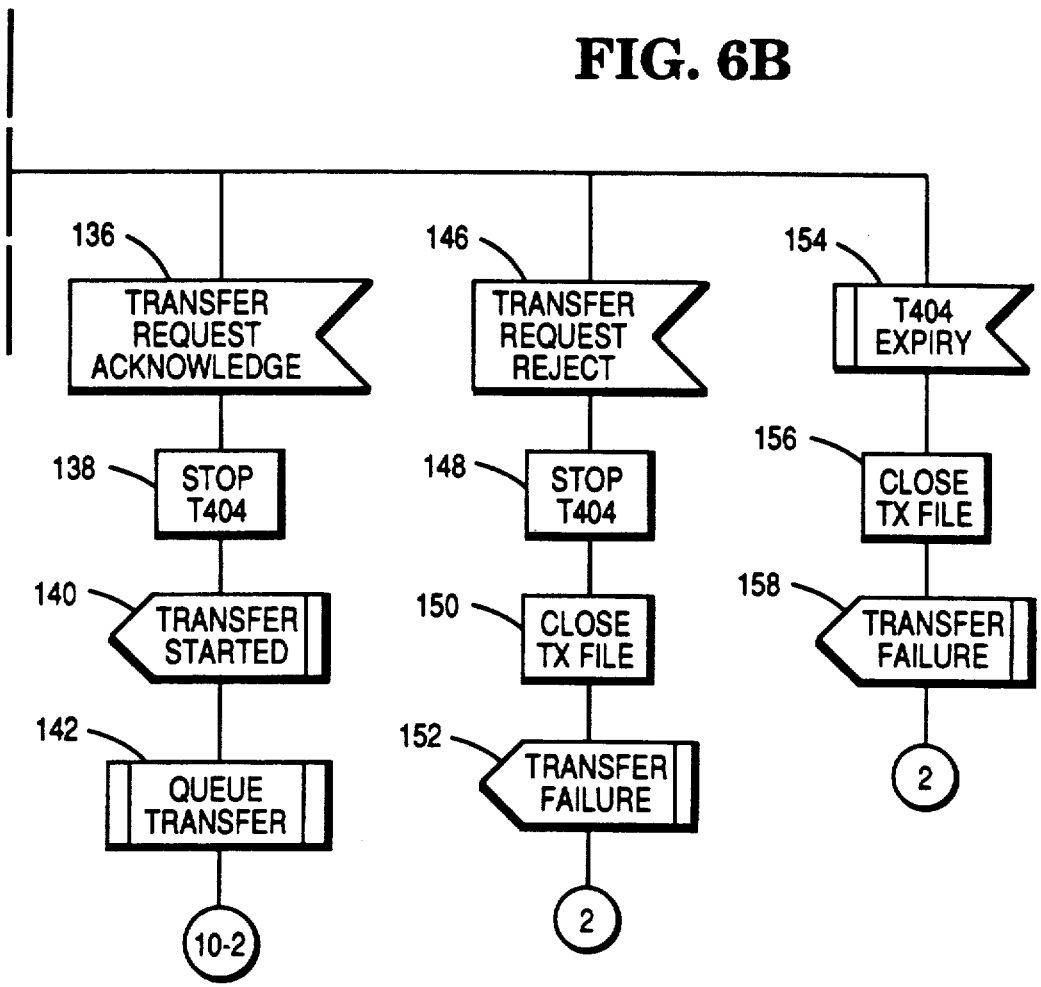

FIGS. 6A and 6B describe the Transmission Requested state 10-1 (block 100). The user of PC 12 has the option of terminating the transfer by providing (through keyboard 38) an abort transfer command (block 122). In response to this command, PC 12 closes the file to be transferred (block 124) and displays a transfer failure message on video monitor 36 (block 126). The file transfer engine then returns to state 2.

A transfer request can also be received by PC 12 in state 10-1 (block 128). A similar procedure to that described with respect to blocks 104, 106, 108, 110, 112 and 114 (FIG. 5) is followed with the file transfer engine entering state 30-1 or 10-1 depending upon whether or not the transfer request is accepted. If a link released indication is received by PC 12 in state 10-1 (block 130), the transfer file is closed (block 132), a link failure message displayed on video monitor 36 (block 134) and the file transfer engine returns to null state 0. A link established indication may sometimes be received (block 133) by local PC 12 if the link is broken and quickly reestablished. The transfer file is closed (block 135), but since the link is established the file transfer engine returns to state 2.

Figure 7A:
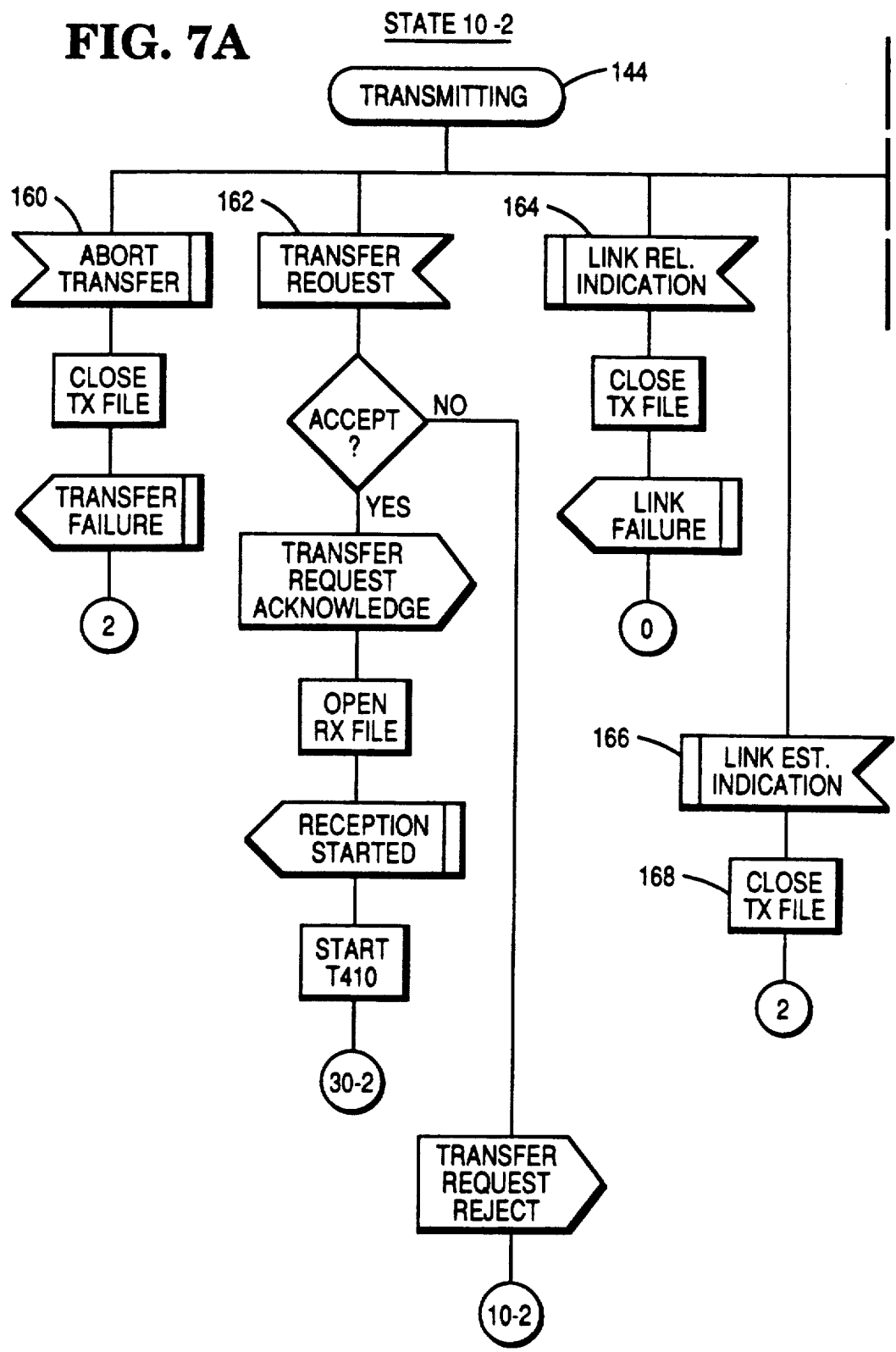
Figure 7B:
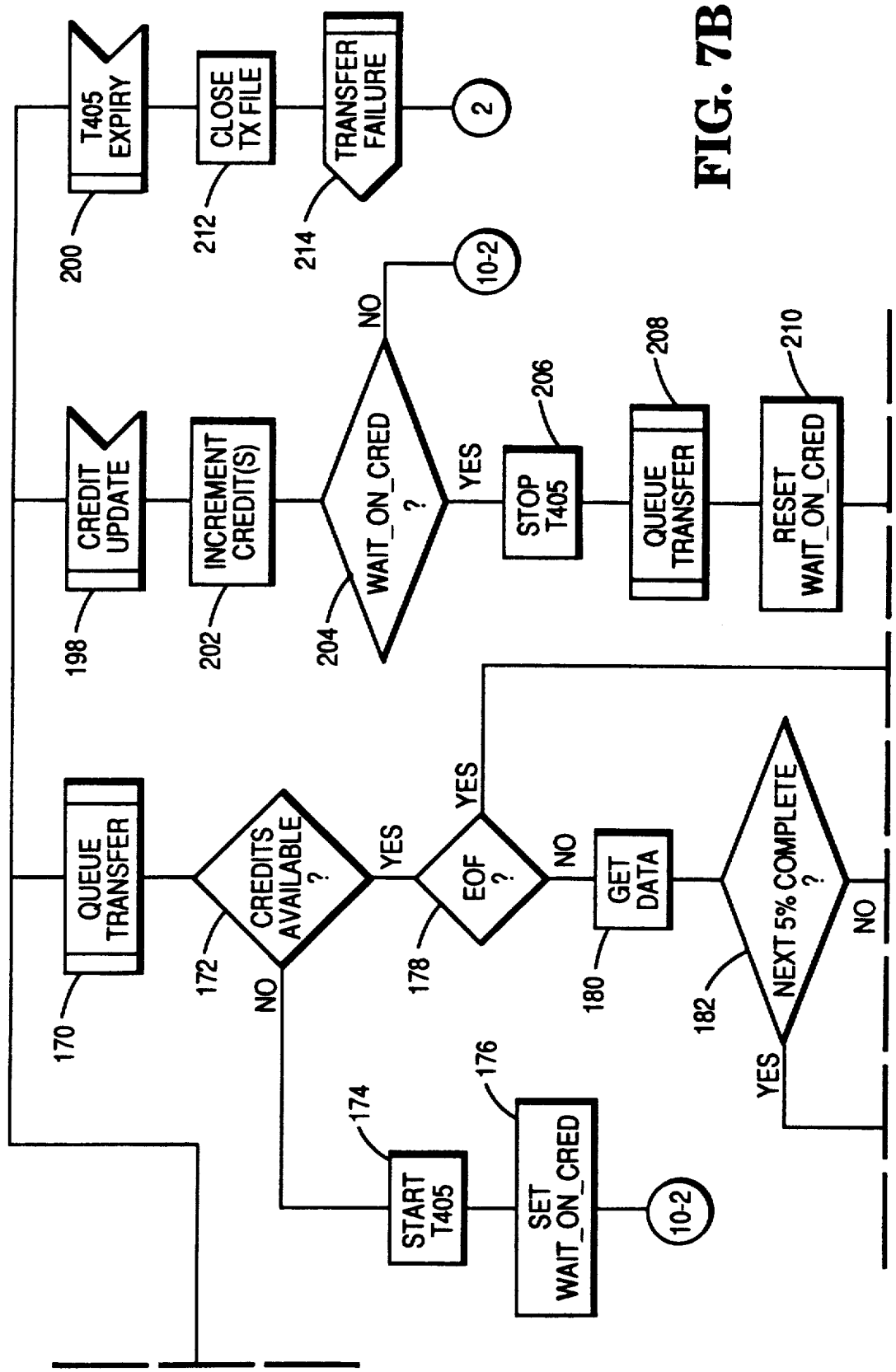

As noted previously, the transfer request from PC 12 (block 96) (FIG. 5) includes the size of the data file to be transferred to remote PC 16. Remote PC 16 uses the file size information to determine if it has sufficient memory space to receive the file. If PC 16 can receive the data file, it transmits a transfer request acknowledgement (block 136) which is received by local PC 12 (FIG. 6B). Timer T404 is stopped (block 138), and a transfer started message is displayed on video monitor 36 (block 140). PC 12 next generates a queue transfer message to itself (block 142) which is the stimulus for data to be transferred. The file transfer engine then enters transmitting state 10-2 (block 144) (FIGS. 7A and 7B).

In Transmission Requested state 10-1 (FIG. 6B), local PC 12 can also receive a transfer request rejection (block 146) from remote PC 16. Timer T404 is stopped (block 148), the transfer file is closed (block 150), and a transfer failure message is displayed on video monitor 36. The file transfer engine then returns to state 2. In the event that neither a transfer request acknowledgement nor a transfer request rejection is received within the time allotted by timer T404, PC 12 receives a time expiration signal (block 154). The transfer file is then closed (block 156), a transfer failure message is displayed on video monitor 36 (block 158), and the file transfer engine returns to state 2.

In Transmitting state 10-2 (FIG. 7A), the user may abort the transfer (block 160), a transfer request may be received from remote PC 16 (block 162), a link released indication of a link failure may be received (block 164), or a link established indication may be received (block 166). For the procedure for aborting the transfer, refer to the discussion with respect to blocks 122, 124 and 126 (FIG. 6A). For the procedure for receiving a transfer request, refer to the discussion with respect to blocks 104, 106, 108, 110, 112 and 114 (FIG. 5); however, note that the file transfer engine goes to different states. For the procedure for receiving a link released indication, refer to the discussion with respect to blocks 130, 132 and 134 (FIG. 6A). For an explanation of the procedure for receiving a link established indication, refer to the discussion with respect to blocks 133 and 135 (FIG. 6A).

Before continuing with a description of Transmitting state 10-2 reference is made to FIG. 1. Counter 22 in PC 12 has an initial number of credits. These credits represent the maximum number of data blocks which may be transferred from PC 12 to interfacing device 14 without receiving an acknowledge signal. As each data block is transferred from PC 12 to interfacing device 14, the credit count is decremented. The count will be incremented upon the receipt from remote PC 16 of an acknowledgement of receipt of each data block. The credit scheme is described in more detail in the copending U.S. patent application Ser. No. 450,972.

Referring again to Transmitting state 10-2 (FIGS. 7B and 7C), the data file may be transmitted by the stimulus of a queue transfer message (block 170). After the queue transfer stimulus (block 170) is generated, counter 22 is checked to verify the availability of credits (block 172). If no credits are available, a timer T405 is set (block 174) to limit the time allotted to receiving a credit update. A flag entitled Wait_On_Cred is then set (block 176), and the file transfer engine returns to Transmitting state 10-2. If credits are available, a check is made to see if the end of the file (EOF) has been reached (block 178). If the end of the file has not been reached, a data block is transferred from local PC 12 to interfacing device 14 (block 180). The percentage of the data file transferred is calculated (block 182) and at predetermined intervals (eg. every 5%) a transfer proceeding message including the percentage of the data file transferred is displayed on video monitor 36 (block 184). Irrespective of whether a message is displayed, data blocks are formatted in interfacing device 14 and transmitted to remote PC 16 over ISDN line 34 (block 186). Counter 22 is decremented for each data block so transferred (block 188), a queue transfer stimulus is again generated (block 190), and the file transfer engine returns to Transmitting state 10-2. In this manner the data file will be transferred from PC 12 to interfacing device 14 block by block from where it will be transmitted to PC 16 a block at a time. When the end of file is reached (block 178), the transferred file is closed (block 192), a transfer end request is transmitted to PC 16 (block 194), a timer T406 is started (block 196) to limit the time allotted to receiving an end of transfer request acknowledgement from PC 16, and the file transfer engine enters Transmission End Requested state 10-3.

The process described in the preceding paragraph is repeated until no credits are available or until the transfer is complete. If no credits are available (block 172) and the file transfer engine returns to state 10-2, either a credit update will be received from interfacing device 14 (block 198) or timer T405 will expire (block 200). If a credit update is received (as a result of an acknowledgement from PC 16) (block 198), counter 22 is incremented with credits (block 202) in response, and the Wait_On_Cred flag is checked (block 204). If the flag is not set the file transfer engine returns to state 10-2. If the flag is set, timer T405 is stopped (block 206), a queue transfer stimulus is generated (block 208), the Wait_On_Cred flag is reset (block 210), and the file transfer engine returns to state 10-2. If timer T405 expires (block 200) before a credit update is received, the transfer file is closed (block 212), and a transfer failure message is displayed on video monitor 36 (block 214).

In Transmission End Requested state 10-3 (block 216) (FIG. 8), an end of transfer request acknowledgement (block 218) may be received from remote PC 16. Timer T406 s stopped (block 220), and a transfer complete message is displayed on video monitor 36 (block 222). If an acknowledgement is not received, but a transfer end rejection is received from PC 16 through interfacing device 14 (block 226), a transfer failed message is displayed on video monitor 36 (block 234). The file transfer engine will then return to state 2. Similarly, if timer T406 expires (block 228), a transfer failed message is displayed on video monitor 36 (block 236), and the file transfer engine will return to state 2.

Other signals receivable by PC 12 while in Transmission End Requested state 10-3 include a transfer request (block 224), a link released indication (block 230) or a link established indication (block 232). If a transfer request is received (block 224) from PC 16, a similar procedure to that described with respect to blocks 104, 106, 108, 110, 112 and 114 (FIG. 5) is followed with the file transfer engine entering state 30-3 or 10-3 depending upon whether or not the transfer request is accepted. If a link released indication (block 230) is received, a link failure message is displayed on video monitor 36 (block 238), and the file transfer engine returns to null state 0. If a link established indication (block 232) is received, the file transfer engine returns to state 2.

FIGS. 9A and 9B describe the data Receiving state 20-2 (block 116). Transferred data (block 240) from PC 16 is received by interfacing device 14 a block at a time. Each data block is checked in interfacing device 14 for transmission errors. Valid data blocks are acknowledged and transferred to PC 12. As the data blocks are stored (block 242) the percentage of the data file received is calculated (block 244). At predetermined intervals (eg. every 5%) a reception proceeding message which includes the percentage of the file received is displayed on video terminal 36 (block 246). After data is stored, a timer T410 is started (or restarted) (block 248) to limit the time allotted for receiving the next data block, and the file transfer engine returns to state 20-2.

If timer T410 expires (block 250) before another data block is transferred, the receiving file is closed (block 252) and deleted (block 254), a reception failed message is displayed on video monitor 36 (block 256), and the file transfer engine returns to state 2. As soon as the entire file is transferred from PC 16, a transfer end request may be received from PC 16 (block 258). Timer T410 (block 260) is stopped and PC 12 will decide (block 262) whether to acknowledge the request. The decision is made by comparing the amount of data received to the file size previously transmitted in the transfer request. If the entire file has been received, the transfer end request is accepted and a transfer end acknowledgement is transmitted to PC 16 (block 264). The reception file is closed (block 266), and a reception completed message is displayed on video monitor 36 (block 268). If the entire file has not been received, the transfer end request is not accepted and a transfer end rejection is transmitted to PC 16 (block 270). The reception file is closed and deleted (block 272) and a reception failed message is displayed on video monitor 36 (block 274). When either the reception completed or reception failed message is displayed on video monitor 36, the file transfer engine returns to state 2.

A feature of the present invention is that a data file may be transferred from remote PC 16 contemporaneously with the transfer of a data file from local PC 12. This is achieved by using conventional digital transmission and reception techniques for simultaneous transfer of digital signals. Referring to FIG. 9B, an attempt may be made to start a file transfer (block 276) from PC 12 to PC 16 while in Receiving state 20-2. The procedure for starting the transfer is described with respect to blocks 90, 92, 94, 96 and 98 (FIG. 5), with the file transfer engine returning to state 20-2 or state 30-1 for a transmission failure or transfer start, respectively. While in Receiving state 20-2, a link released indication (block 278) or a link established indication (block 280) may be received. If a link released indication is received (block 278), the receiving file is closed (block 282) and deleted (block 284), a link failure message is displayed on video monitor 36 (block 286), and the file transfer engine returns to null state 0. If a link established indication is received (block 280), the receiving file is closed (block 288) and deleted (block 290), and the file transfer engine returns to state 2.

Figure 10A:
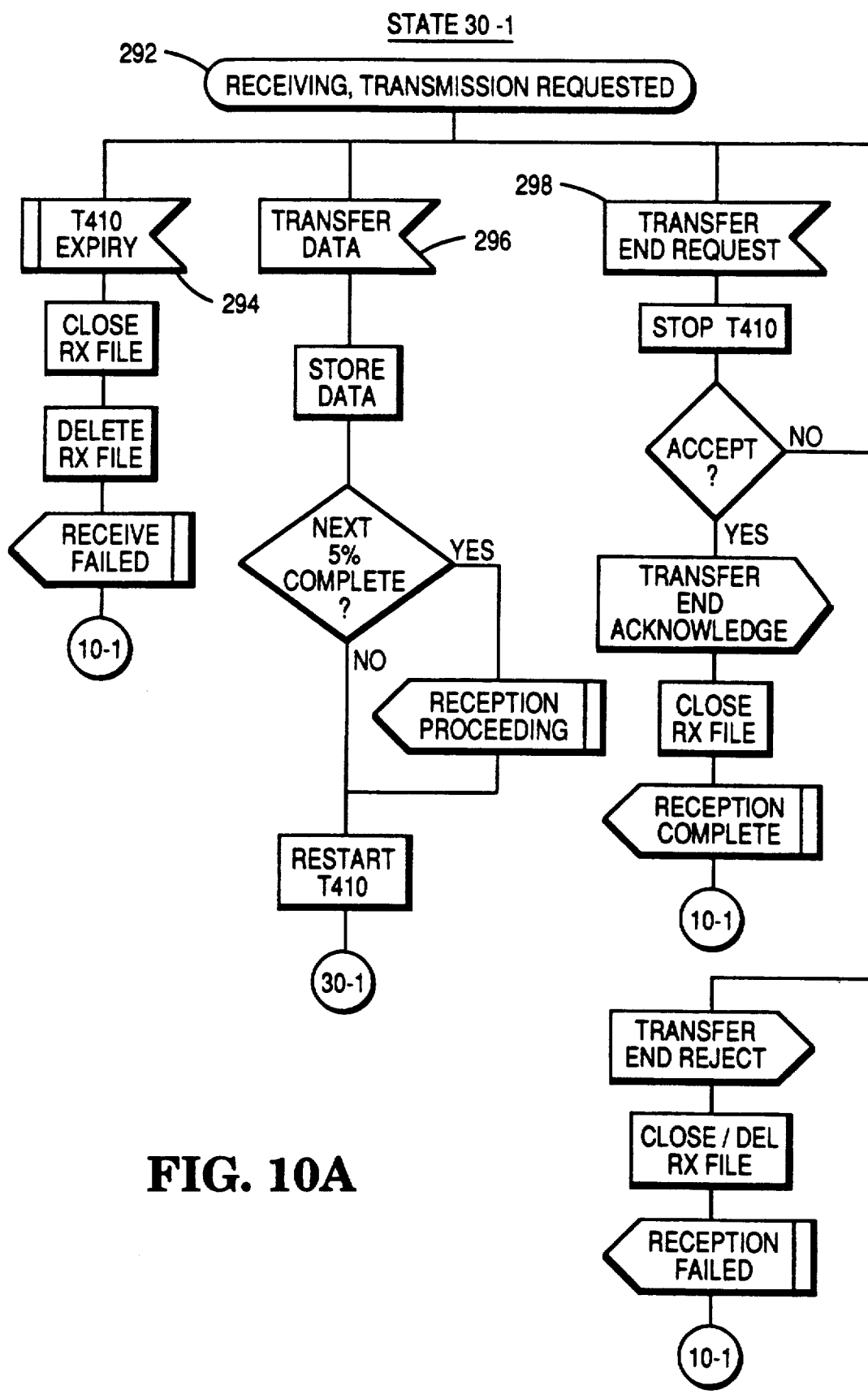
Figure 10B:
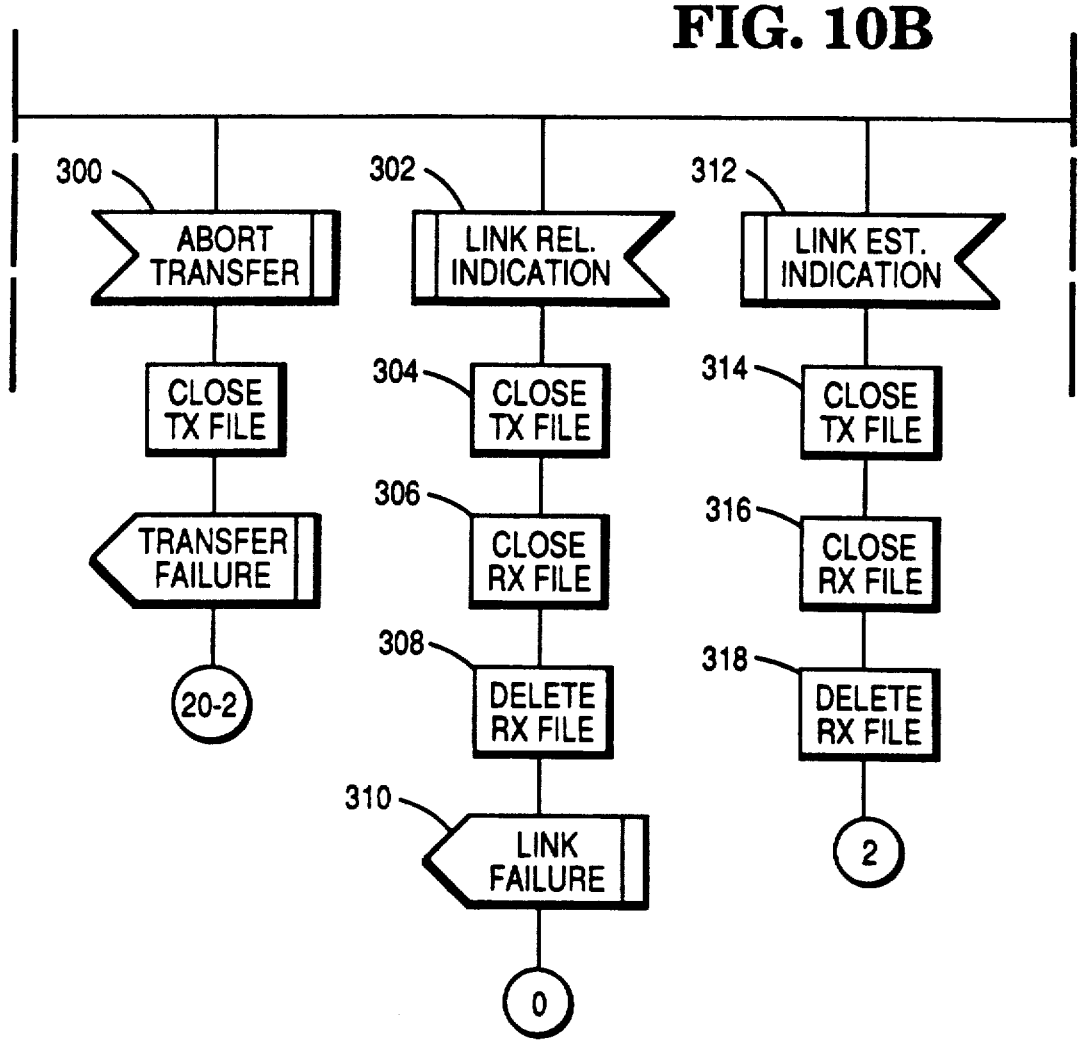
Figure 10C:
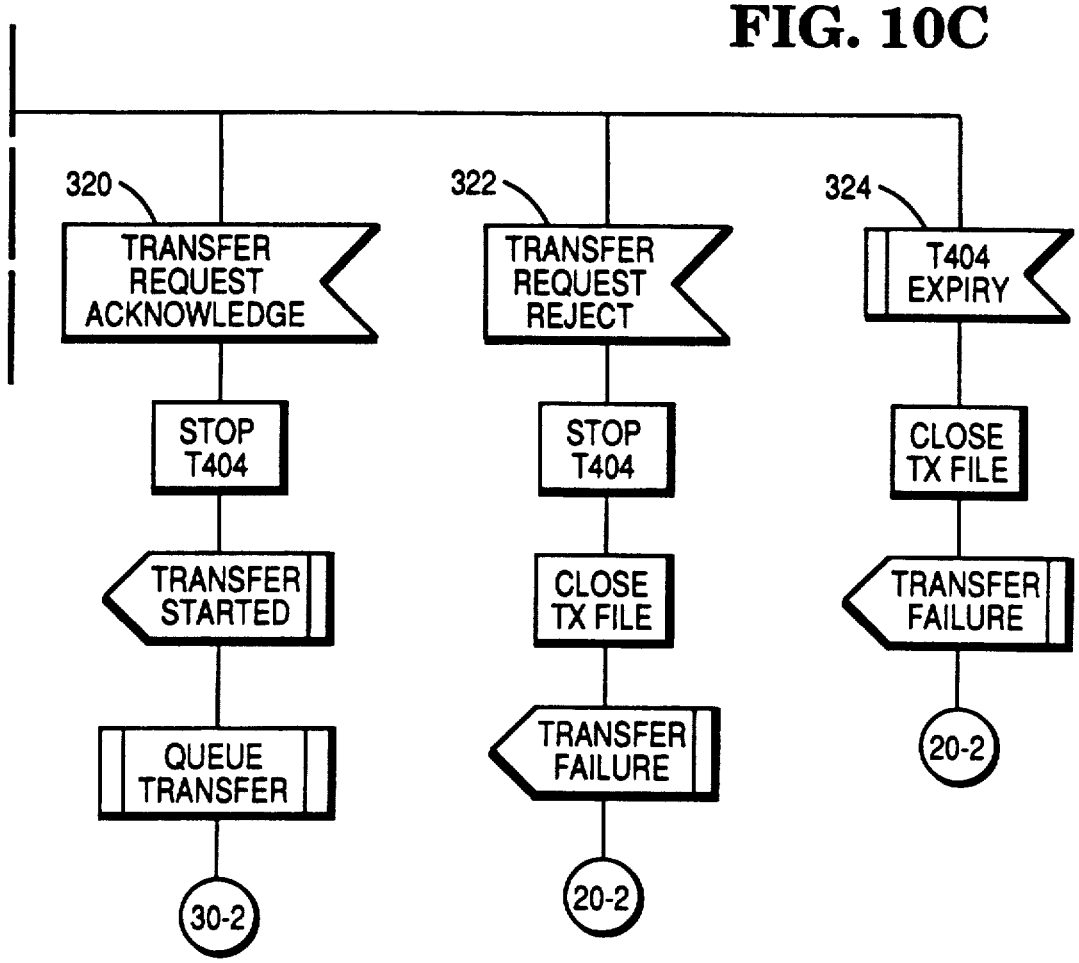
Figure 10:
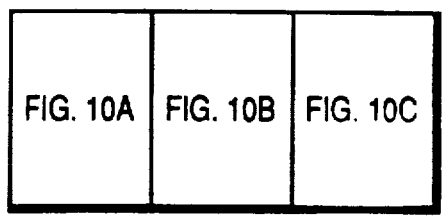

FIGS. 10A, 10B and 10C describe the data Receiving, Transmission Requested state 30-1 (block 292). It should be noted that the conditions of timer T410 expiring (block 294) and data transfer from remote PC 16 (block 296), and the reception of a transfer end request from remote PC 16 (block 298) (FIG. 10A) are similar to those conditions shown at blocks 250, 240 and 258, respectively, in state 20-2 (FIG. 9A). For a description of their operation, reference should be made thereto. It should also be noted that at the end of each procedure the return state for the file transfer engine is different.

Referring to FIG. 10B, an abort transfer message (block 300) may be provided by the user of PC 12. The procedure is described in blocks 122, 124 and 126 (FIG. 6A) with the file transfer engine returning to state 20-2. If a link released indication (block 302) is received, the transfer file is closed (block 304), the receiving file is closed (block 306) and deleted (block 308), a link failure message is displayed on video terminal 36 (block 310), and the file transfer engine returns to null state 0. If a link establish indication (block 312) is received, the transfer file is closed (block 314), the receiving file is closed (block 316) and deleted (block 318), and the file transfer engine returns to state 2.

Referring to FIG. 10C, a transfer request acknowledgement (block 320) or a transfer request rejection (block 322) may be received from remote PC 16, or timer T404 may expire (block 324). For a description of the procedure for receiving a transfer request acknowledgment, refer to blocks 136, 138, 140 and 142 (FIG. 6B). For a description of the procedure for receiving a transfer request rejection, refer to blocks 146, 148, 150 and 152 (FIG. 6B). For a description of the procedure for the expiration of timer T404, refer to blocks 154, 156 and 158 (FIG. 6B). It will be noted that at the end of each procedure the return state for the file transfer engine is different.

Figure 11A:
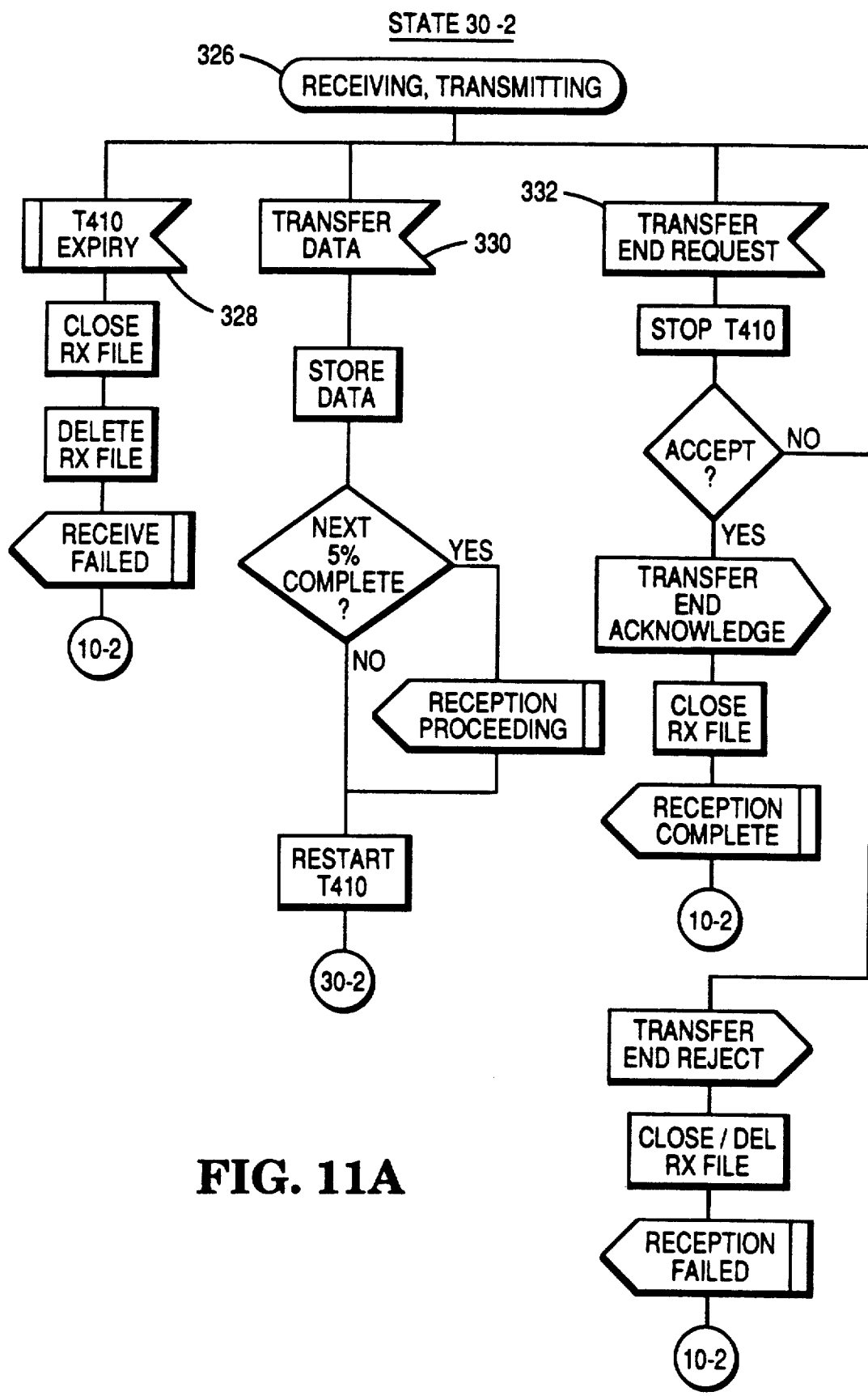

As noted previously, a feature of the present invention is that data files may be received and transmitted at the same time. FIGS. 11A, 11B, 11C and 11D describe the Receiving, Transmitting (block 326) state 30-2. Referring to FIG. 11A, timer T410 may expire (block 328), data may be transferred (block 330) from remote PC 16, or a transfer end request (block 332) may be received from PC 16. For a description of the procedure for the expiration of a timer T410, refer to blocks 250, 252, 254 and 256 (FIG. 9A). For a description of the procedure for the expiration of data transfer from PC 16, refer to blocks 240, 242, 244, 246 and 248 (FIG. 9A). For a description of the procedure for receiving transfer end request from PC 16, refer to blocks 258, 260, 262, 264, 266, 268, 270, 272 and 274 (FIG. 9A). It will be noted that at the end of each procedure the return state for the file transfer engine is different.

Referring to FIG. 11B, an abort transfer message (block 334) may be provided by the user of PC 12, or a link released indication (block 336) or a link established indication (block 328) may be received from PC 16. For a description of the procedure for an abort transfer message being provided, refer to blocks 122, 124 and 126 (FIG. 6A). For a description of the procedure for receiving a link released indication from interfacing device 14, refer to blocks 302, 304, 306, 308 and 310 (FIG. 10B). For a description of the procedure for receiving a link established indication from interfacing device 14, refer to blocks 312, 314, 316 and 318 (FIG. 10B). It will be noted that at the end of each procedure the return state for the file transfer engine is different.

Figure 11C:
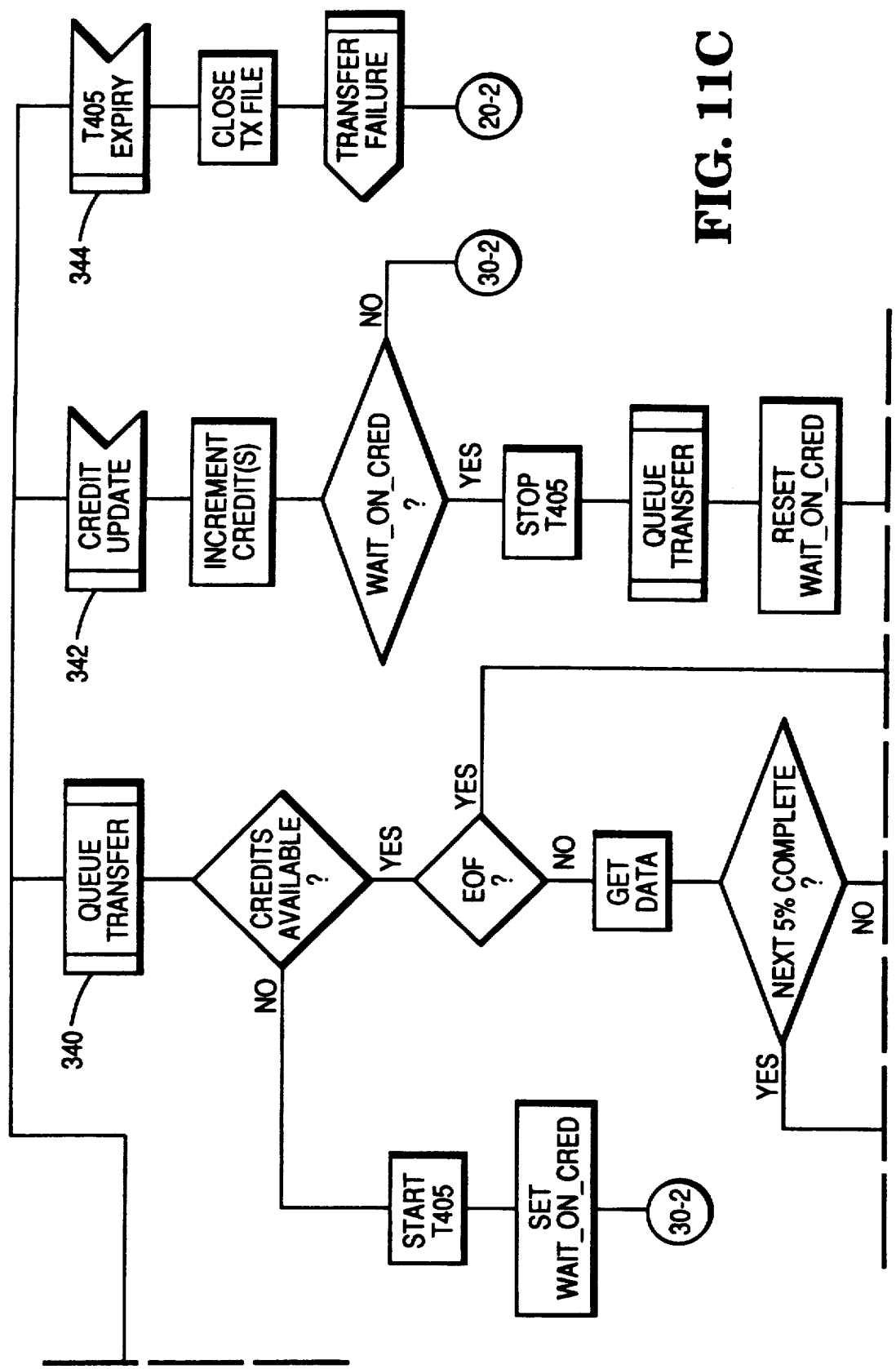

Referring to FIGS. 11C and 11D, PC 12 may start a data transfer by generating a queue transfer message to itself (block 340), a credit update may be received from interfacing device 14 (block 342), or timer T405 may expire (block 344). For a description of the procedure for transferring a data block, refer to blocks 170, 172, 174, 176, 178, 180, 182, 184, 186, 188, 190, 192, 194 and 196 (FIGS. 7B and 7C). For a description of the procedure for receiving a credit update from interfacing device 14, refer to blocks 198, 202, 204, 206, 208 and 210 (FIGS. 7B and 7C). For a description of the procedure for the expiration of timer T405, refer to blocks 200, 212 and 214 (FIG. 7B). It will be noted that at the end of each procedure the return state for the file transfer engine is different.

Figure 12A:
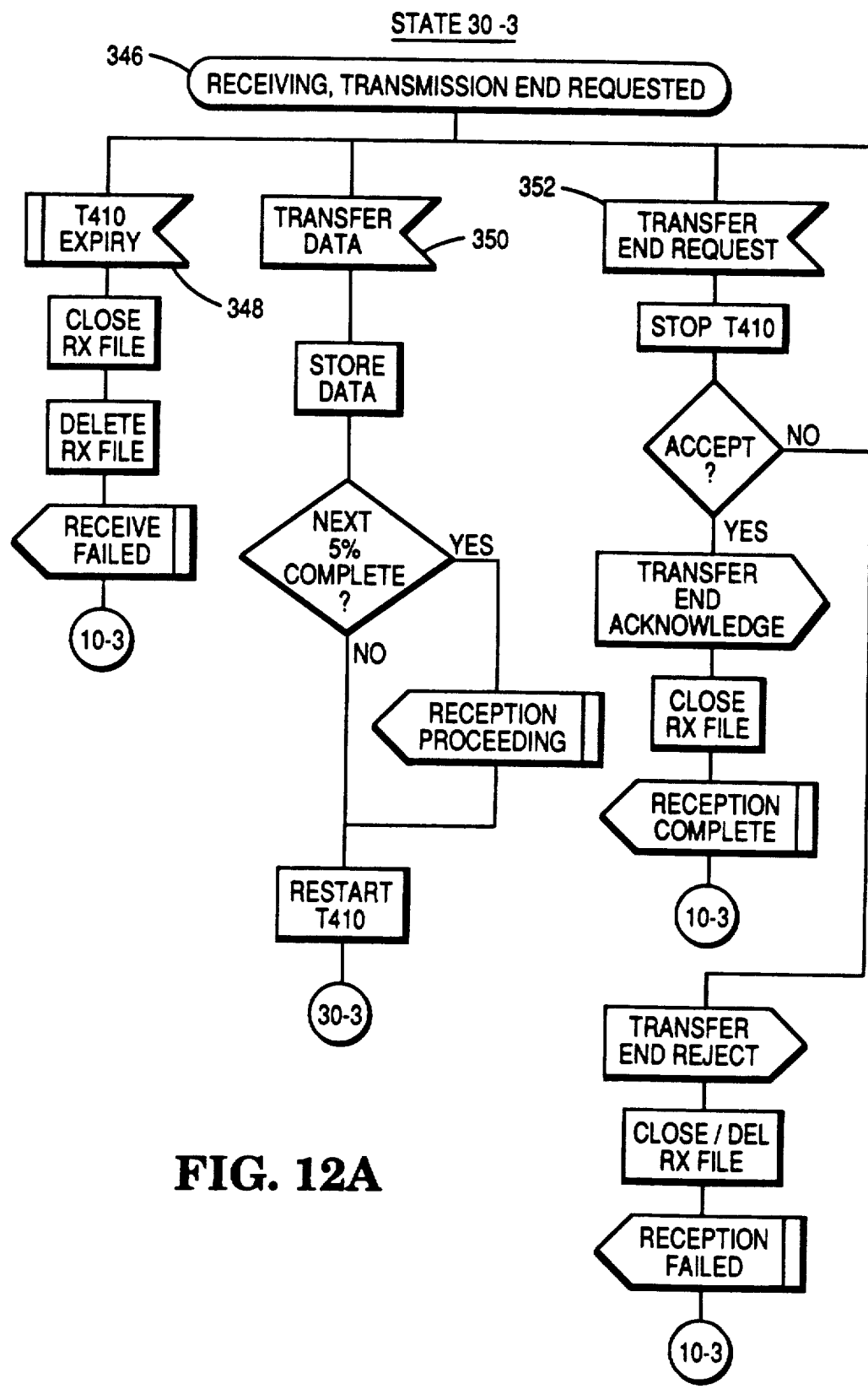
Figure 12B:
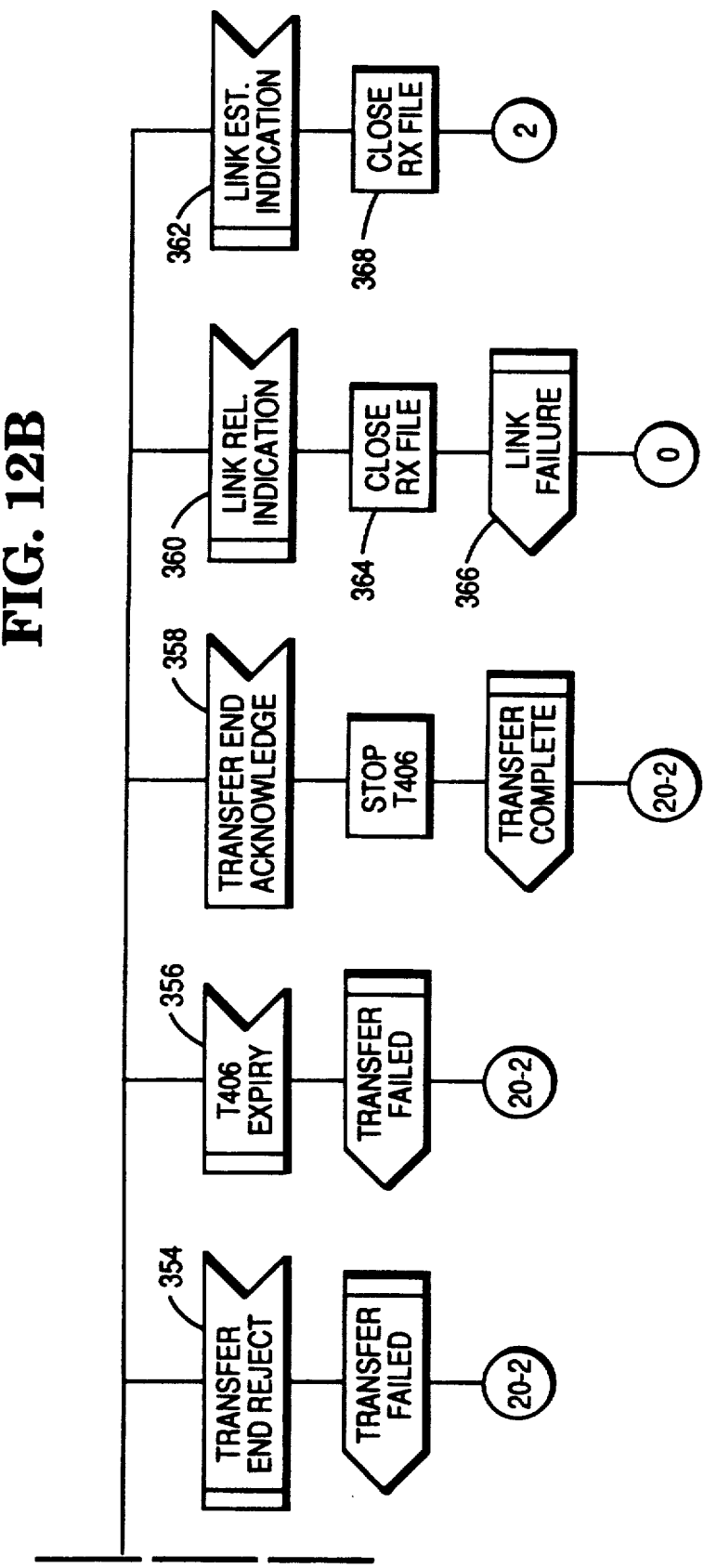

FIGS. 12A and 12B describe the Receiving, Transmission End Requested (block 346) state 30-3. Referring to FIG. 12A, timer T410 may expire (block 348), data may be transferred (block 350) from PC 16, or a transfer end request (block 352) may be received from PC 16. For a description of the procedure for the expiration of timer T410, refer to blocks 250, 252, 254 and 256 (FIG. 9A). For a description of the procedure for the transfer of data from PC 16, refer to blocks 240, 242, 244, 246 and 248 (FIG. 9A). For a description of the procedure for receiving a transfer end request from PC 16, refer to blocks 258, 260, 262, 264, 266, 268, 270, 272 and 274 (FIG. 9A). It will be noted that at the end of each procedure the return state for the file transfer engine is different.

Figure 8:
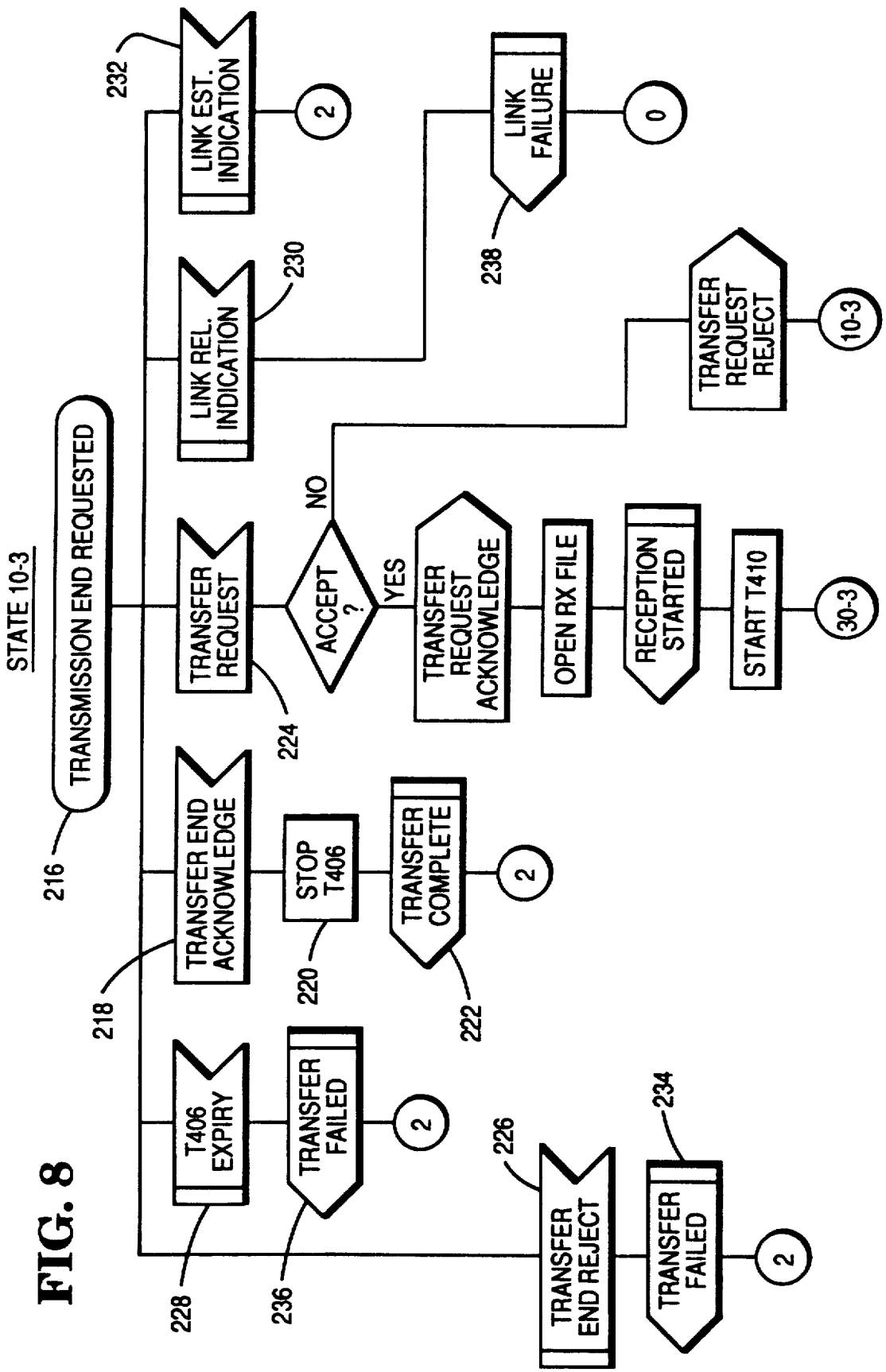

Referring to FIG. 12B, a transfer end rejection (block 354) may be received from interfacing device 14, timer T406 may expire (block 356), a transfer end acknowledgement may be received from remote PC 16 (block 358), or a link released indication (block 360) or link established indication (block 362) may be received from interfacing device 14. For a description of the procedure for receiving a transfer end rejection, refer to blocks 226 and 234 (FIG. 8). For a description of the procedure for the expiration of timer T406, refer to blocks 228 and 236 (FIG. 8). For a description of the procedure for receiving a transfer end acknowledgement from remote PC 16, refer to blocks 218, 220 and 222 (FIG. 8). It will be noted that at the end of each procedure the return state for the file transfer engine is different. If a link released indication is received from interfacing device 14 (block 360), the receiving file is closed (block 364), a link failure message is displayed on video monitor 36 (block 366), and the file transfer engine returns to null state 0. If a link established indication is received from interfacing device 14 (block 362), the receiving file is closed (block 368), and the file transfer engine returns to state 2.

Figure 13:
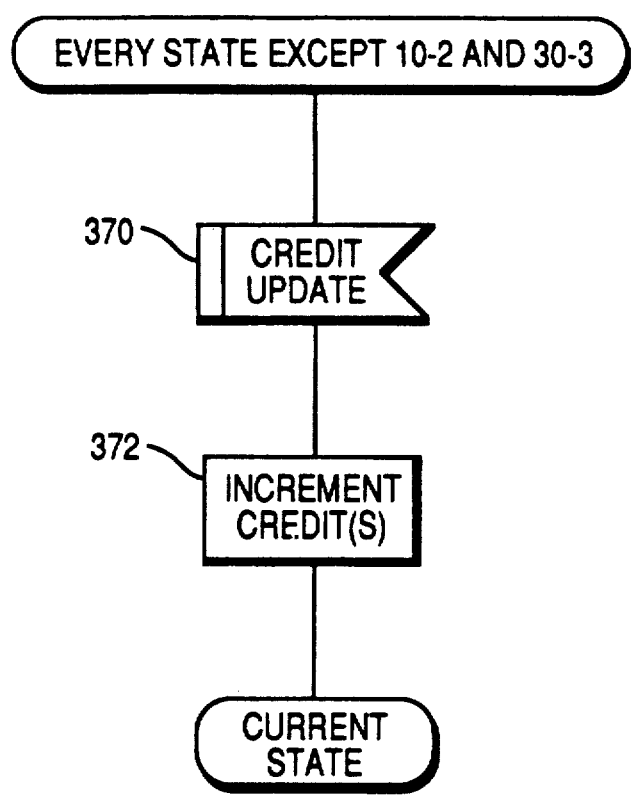

FIG. 13 shows a procedure that may occur from any state except states 10-2 and 30-2. A credit update is received by PC 12 from interfacing device 14 (block 370). Counter 22 in PC 12 is incremented (block 372) in response thereto. The file transfer engine then returns to the current state.

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent of the United States is as follows.

What is claimed is:

1. A method for high speed data transfer between a user operated PC and a remote PC, comprising:
   establishing a physical data link between said user operated PC and remote PC;
   transferring a data file from said user operated PC to an interfacing device, said interfacing device being connected to said user operated PC and having a dedicated processor; and
   formatting said file in said interfacing device into a data link protocol, and transmitting said formatted file therefrom to said remote PC over an ISDN line.

2. The method of claim 1, wherein said establishing step includes:
   said user inputting a link request to said user operated PC;
   transferring said link request from said PC to said interfacing device;
   formatting said link request in said interfacing device into a data link protocol, and transmitting said formatted request to said remote PC over said ISDN line;
   receiving a link established signal transmitted from said remote PC to said interfacing device;
   transferring said link established signal from said interfacing device to said user operated PC; and
   displaying a link established message on a video monitor connected to said user operated PC.

3. The method of claim 2 further including, after providing said link request:
   starting a timer to limit the time allotted to establishing said link.

4. The method of claim 3 further including, after transferring said link established signal:
   stopping said timer.

5. The method of claim 1, wherein said transferring step includes:
   opening said data file in said user operated PC;
   providing a transfer request, including the size of said file, to said interfacing device;
   transmitting said transfer request from said interfacing device to said remote PC; and
   receiving a transfer request acknowledgement from said remote PC.

6. The method of claim 5 further including, after transmitting said transfer request:
   starting a timer to limit the time allotted to receiving said transfer request acknowledgement.

7. The method of claim 6 further including, after receiving said transfer request acknowledgement:
   stopping said timer.

8. The method of claim 5 further including, after receiving said transfer request acknowledgement:
   displaying a transfer started message on a video monitor connected to said user operated PC.

9. The method of claim 5 wherein said user operated PC includes a counter having an initial number of credits, and wherein, after receiving said transfer request acknowledgement, said transferring step further includes:
   verifying the availability of credits by checking said counter;
   transferring said data file from said user operated PC to said interfacing device a block at a time; and
   decrementing said counter for each such block transferred.

10. The method of claim 9 further including:
    repeating said verifying, transferring and decrementing steps until no credits are available or said transfer is complete.

11. The method of claim 9 further including:
    incrementing said counter in response to an acknowledgement signal by said remote PC of receipt of a data block.

12. The method of claim 1 wherein said transferring step includes:
    calculating the percentage of said file transferred; and
    displaying said percentage on a video monitor connected to said user operated PC.

13. The method of claim 12 wherein said transferring step further includes, after said file has been completely transferred to said interfacing device:
    closing said file; and
    transmitting an end of transfer request to said remote PC.

14. The method of claim 13 further including, after transmitting said end of transfer request:
    receiving an end of transfer request acknowledgement from said remote PC; and
    displaying a transfer complete message on said video monitor.

15. The method of claim 14 further including, after transmitting said end of transfer request:
    starting a timer to limit the time allotted to receiving said end of transfer request acknowledgement from said remote PC.

16. The method of claim 15 further including, after receiving said end of transfer request acknowledgement:
    stopping said timer.

17. The method of claim 1 further comprising:
    transferring a second data file from said remote PC to said user operated PC contemporaneously with said transferring, formatting and transmitting steps.

18. The method of claim 17 said step of transferring said second data file includes:
    receiving a transfer request, which includes the size of said second data file, from said remote PC;
    verifying that said user operated PC has sufficient memory space to store said second data file;
    transmitting a transfer request acknowledgement to said remote PC; and
    displaying a data reception started message on a video monitor connected to said user operated PC.

19. The method of claim 18 further including, after displaying said message:
    receiving blocks of data from said second data file into said interfacing device;
    checking said data blocks, in said interfacing device, for transmission errors; and
    transferring valid data blocks to said user operated PC.

20. The method of claim 19 further including, after transferring valid data blocks:
    calculating the percentage of said second data file received; and
    displaying said percentage on said video monitor.

21. The method of claim 20 further including:
    receiving a transfer end request from said remote PC;
    transmitting a transfer end acknowledgement to said remote PC; and
    displaying a reception completed message on said video monitor.

22. The method of claim 1 wherein said data file is transferred from said user operated PC to said interfacing device a block at a time and wherein said formatting and transmitting is done a block at time.

23. A method for high speed data transfer between a user operated PC and a remote PC, comprising:
 a. establishing a link between said user operated PC and remote PC by:
  said user inputting a link request to said user operated PC;
  transferring said link request from said PC to an interfacing device, said interfacing device being connected to said user operated PC and having a dedicated processor;
  formatting said link request in said interfacing device into a data link protocol, and transmitting said formatted request to said remote PC over an ISDN line;
  receiving a link established signal transmitted from said remote PC to said interfacing device;
  transferring said link established signal from said interfacing device to said user operated PC; and
  displaying a link established message on a video monitor connected to said user operated PC;
 b. transferring a data file from said user operated PC to said interfacing device by:
  opening said data file in said user operated PC;
  providing a transfer request, including the size of said file, from said user operated PC to said interfacing device;
  transmitting said transfer request from said interfacing device to said remote PC;
  receiving a transfer request acknowledgement from said remote PC; and
  transferring said file from said user operated PC to said interfacing device a block at time;
 c. formatting each of said data blocks in said interfacing device into a data link protocol, and transmitting said formatted blocks therefrom to said remote PC over said ISDN line; and
 d. transferring a second data file from said remote PC to said user operated PC contemporaneously with steps b and c.

24. The method of claim 23 wherein said user operated PC includes a counter having an initial number of credits, and wherein, after receiving said transfer request acknowledgement, said transferring step further includes:
 verifying the availability of credits by checking said counter; and
 decrementing said counter for each data block transferred from said user operated PC to said interfacing device.

25. The method of claim 24 further including:
 repeating said verifying and decrementing steps until no credits are available or the transfer of said file from said user operated PC is complete.

26. The method of claim 25 further including:
 incrementing said counter in response to an acknowledgement signal by said remote PC of receipt of a data block.

27. A method for high speed data transfer between a user operated PC and a remote PC, comprising:
 establishing a physical data link between said user operated PC and remote PC;
 transferring a data block from said user operated PC to an interfacing device, said interfacing device being connected to said user operated PC and having a dedicated processor; and
 formatting said block in said interfacing device into a data link protocol, and transmitting said formatted block therefrom to said remote PC over an ISDN line.

* * * * *